US011877165B2

(12) United States Patent
Muhammad et al.

(10) Patent No.: US 11,877,165 B2
(45) Date of Patent: Jan. 16, 2024

(54) USING ALTERNATIVE PATHS OF DESCENDANT NODES FOR BACKHAUL-LINK FAILURE REPORTING IN INTEGRATED ACCESS

(71) Applicant: Telefonaktiebolaget LM Ericsson (publ), Stockholm (SE)

(72) Inventors: Ajmal Muhammad, Sollentuna (SE); Oumer Teyeb, Montréal (CA); Gunnar Mildh, Sollentuna (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 286 days.

(21) Appl. No.: 17/430,532

(22) PCT Filed: Feb. 12, 2020

(86) PCT No.: PCT/EP2020/053641
§ 371 (c)(1),
(2) Date: Aug. 12, 2021

(87) PCT Pub. No.: WO2020/165278
PCT Pub. Date: Aug. 20, 2020

(65) Prior Publication Data
US 2022/0132337 A1 Apr. 28, 2022

Related U.S. Application Data

(60) Provisional application No. 62/805,015, filed on Feb. 13, 2019.

(51) Int. Cl.
*H04W 24/04* (2009.01)
*H04W 76/19* (2018.01)
(Continued)

(52) U.S. Cl.
CPC ........... *H04W 24/04* (2013.01); *H04W 40/34* (2013.01); *H04W 76/19* (2018.02); *H04L 45/02* (2013.01)

(58) Field of Classification Search
CPC ..... H04W 76/19; H04W 40/24; H04W 40/34; H04W 24/02; H04W 88/085; H04W 92/20; H04L 45/02
See application file for complete search history.

(56) References Cited

U.S. PATENT DOCUMENTS

2018/0092139 A1* 3/2018 Novlan ................ H04W 76/12
2019/0223002 A1* 7/2019 Novlan ................ H04W 72/20
(Continued)

OTHER PUBLICATIONS

International Search Report and Written Opinion dated May 29, 2020 for International Application No. PCT/EP2020/053641 filed Feb. 12, 2020, consisting of 13-pages.
(Continued)

*Primary Examiner* — Gary Mui
(74) *Attorney, Agent, or Firm* — Christopher & Weisberg, P.A.

(57) ABSTRACT

A method, system and apparatus are disclosed. According to one or more embodiments, a child IAB node is configured to communicate with a first parent IAB node and a descendant IAB node over a backhaul network. The child IAB node includes processing circuitry configured to: detect a backhaul link failure between the child IAB node and the first parent IAB node; in response to the detected backhaul link failure, cause transmission of a radio link failure indication to the descendant IAB node; receive signaling indicating for the child IAB node to connect to a second parent IAB node; and modify network topology at least in part by connecting to the second parent IAB node.

20 Claims, 21 Drawing Sheets

(51) Int. Cl.
*H04W 40/34* (2009.01)
*H04L 45/02* (2022.01)

(56) References Cited

U.S. PATENT DOCUMENTS

| | | | |
|---|---|---|---|
| 2020/0045610 A1* | 2/2020 | Shih | H04L 45/28 |
| 2021/0152515 A1* | 5/2021 | Akl | H04W 40/22 |
| 2021/0159968 A1* | 5/2021 | Fujishiro | H04L 1/16 |
| 2021/0258244 A1* | 8/2021 | Xu | H04L 45/28 |
| 2022/0015176 A1* | 1/2022 | Ishii | H04W 76/19 |
| 2022/0141910 A1* | 5/2022 | Muhammad | H04L 45/28 370/329 |

OTHER PUBLICATIONS

3GPP TR 38.874 V16.0.0; 3rd Generation Partnership Project; Technical Specification Group Radio Access Network; NR; Study on Integrated Access and Backhaul; (Release 16), Dec. 2018, consisting of 111-pages.

3GPP TSG RAN WG1 #94 R1-1808515; Title: Discussions on node behavior for IAB link management; Agenda Item: 7.2.3.3; Source: LG Electronics; Document for: Discussion and decision; Date and Location: Aug. 20-24, 2018, Gothenburg, Sweden, consisting of 7-pages.

3GPP TSG-RAN WG2 NR AdHoc 1807 R2-1810211; Title: Discussions on IAB topology adaptation; Agenda Item: 11.1.3; Source: ZTE; Document for: Discussion and Approval; Date and Location: Jul. 2-6, 2018, Montreal, Canada, consisting of 4-pages.

3GPP TSG RAN WG3 Meeting #102 R3-186421; Title: Procedures for backhaul link failure and recovery; Agenda Item: 24.2; Source: ZTE, Sanechips; Document for: Discussion and Approval; Date and Location: Nov. 12-16, 2018, Spokane, USA, consisting of 9-pages.

3GPP TR 38.874 0.7.0; 3rd Generation Partnership Project; Technical Specification Group Radio Access Network; Study on Integrated Access and Backhaul; (Release 15), Nov. 2018, consisting of 111-pages.

* cited by examiner

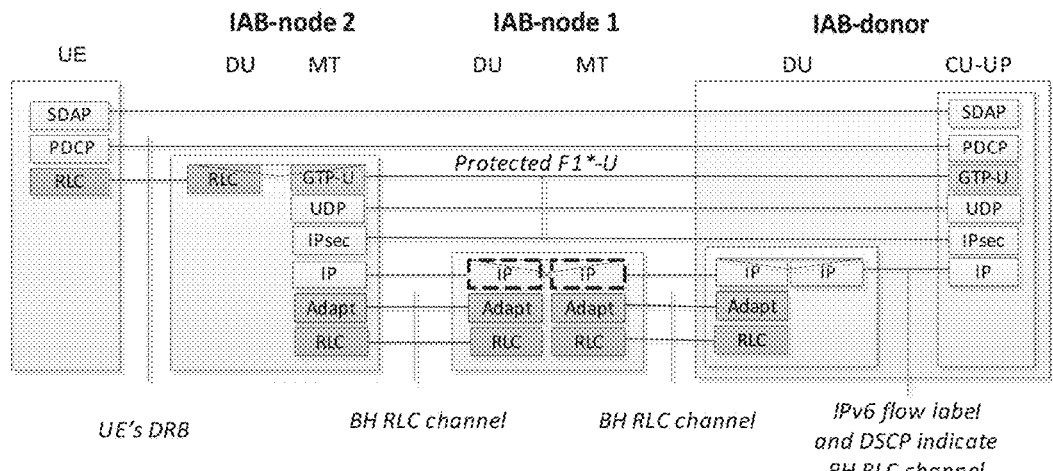
FIG. 7
PRIOR ART
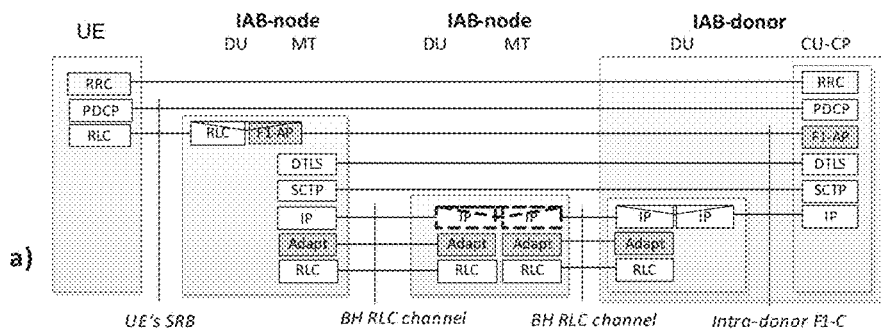
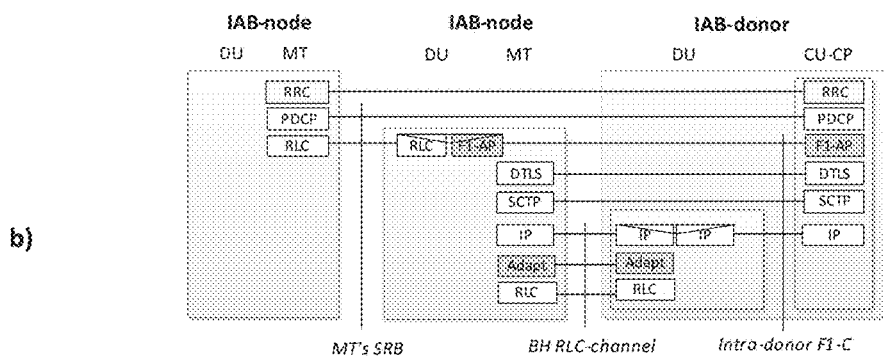
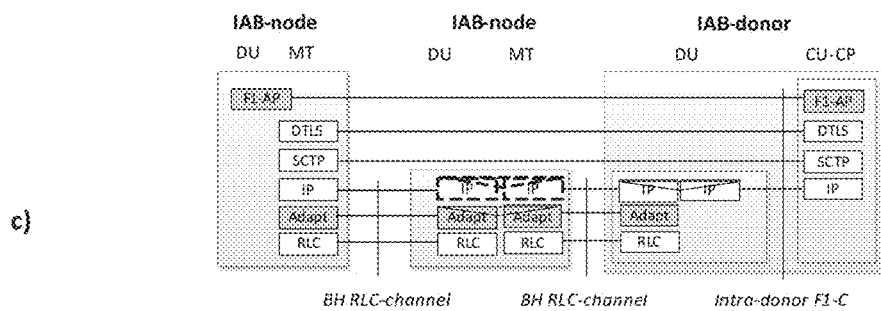
FIG. 8
PRIOR ART

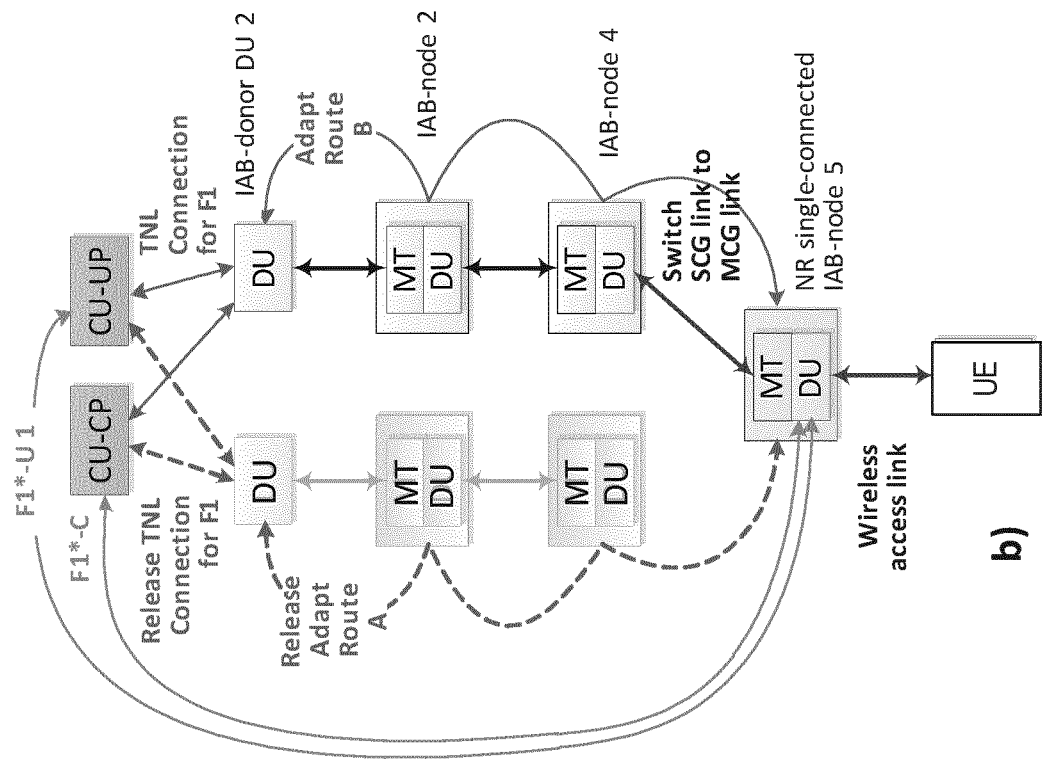
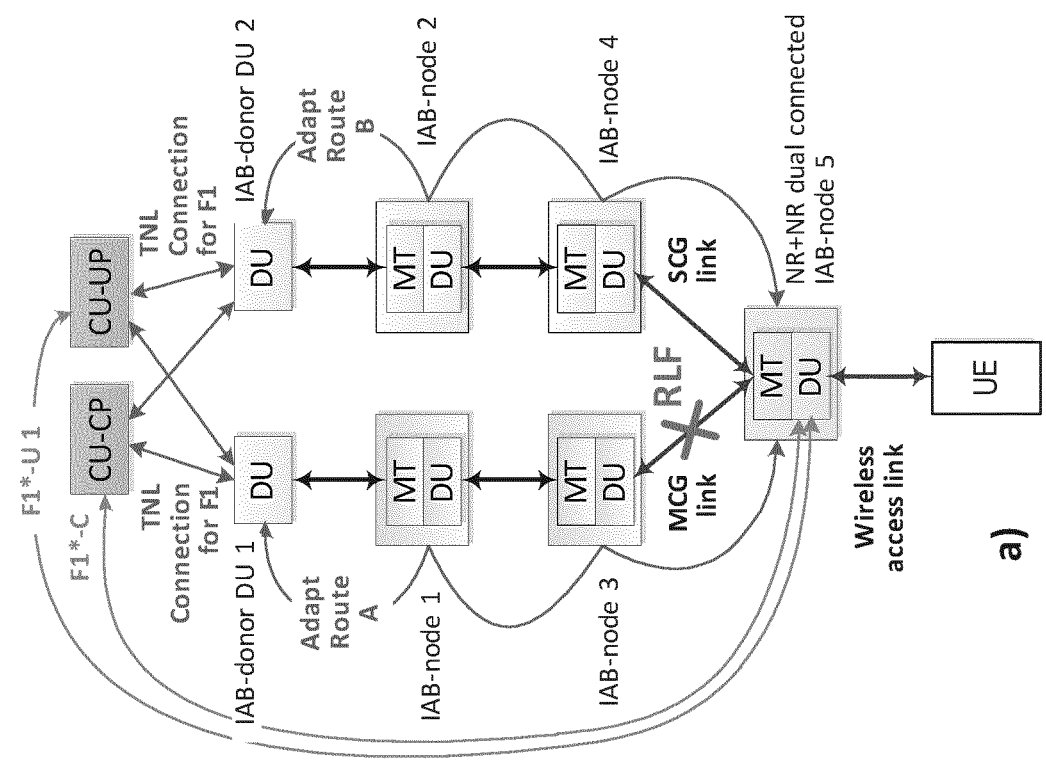
FIG. 12

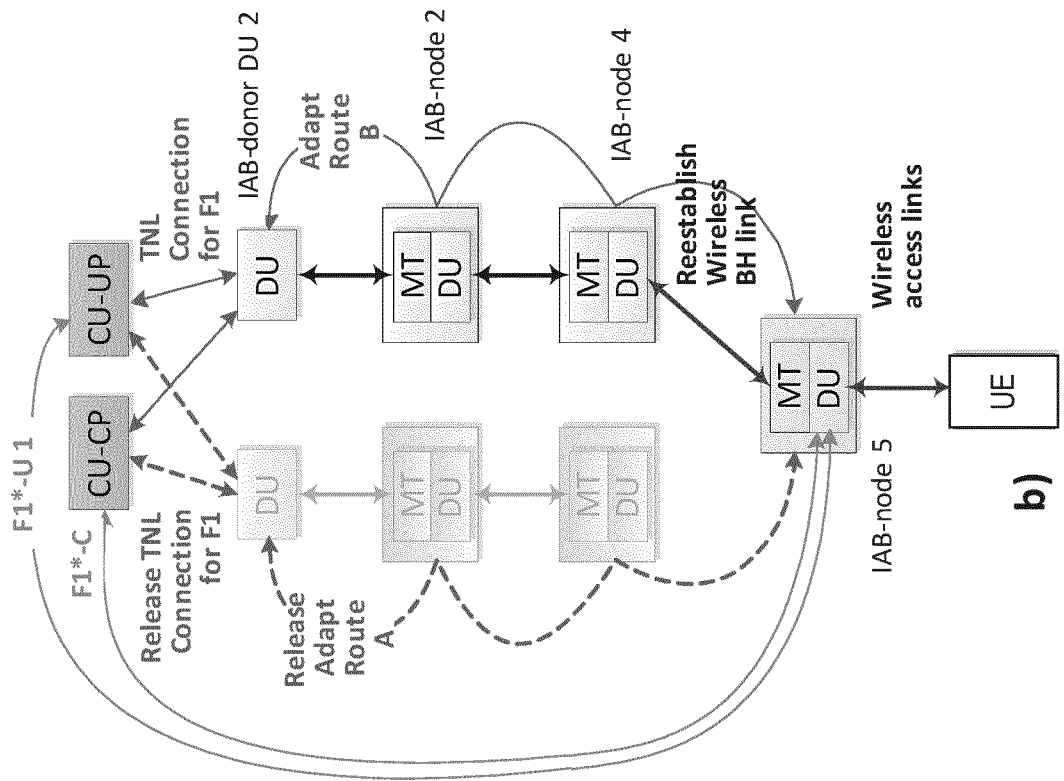
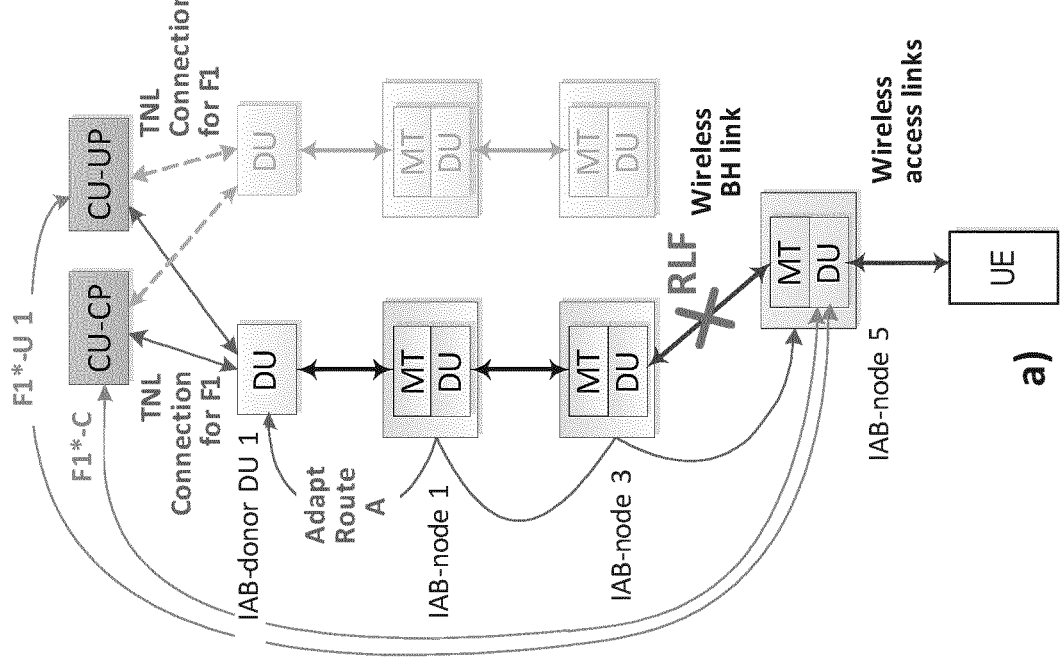
FIG. 14

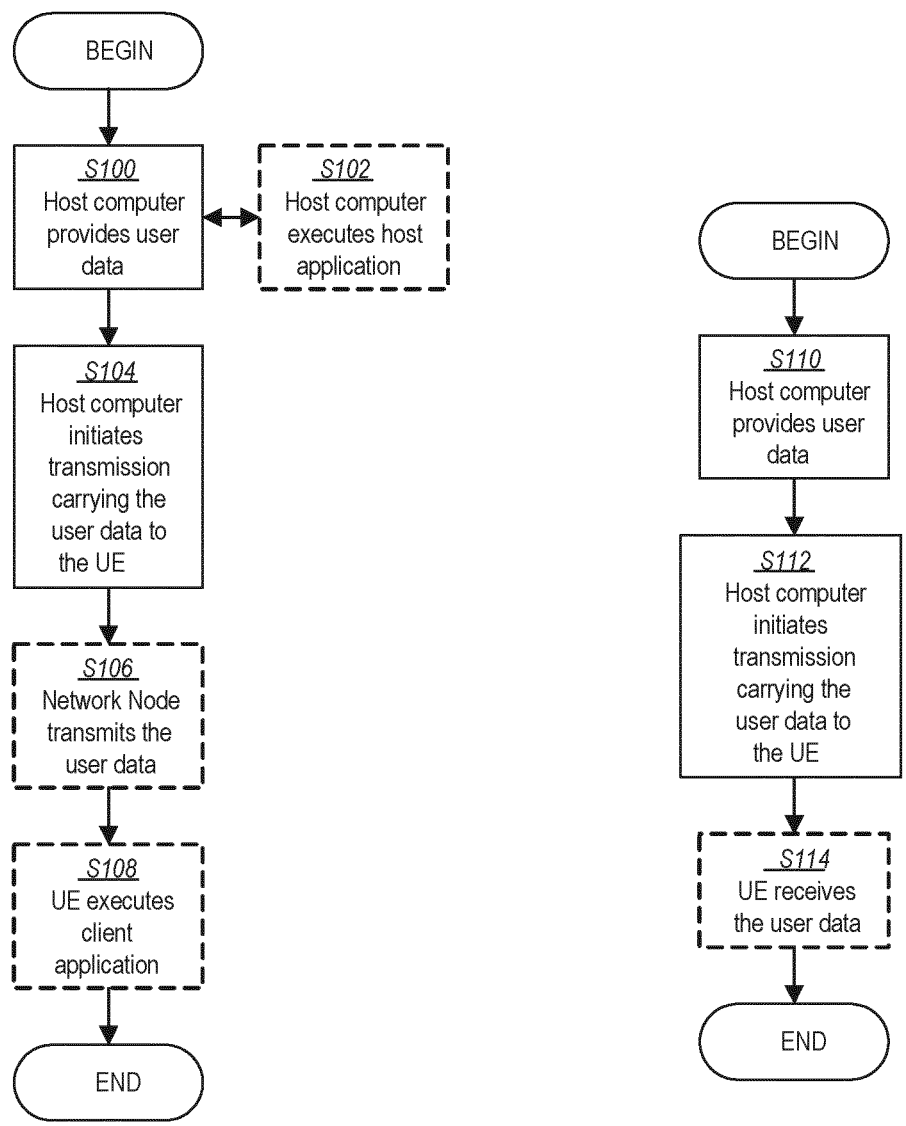

USING ALTERNATIVE PATHS OF DESCENDANT NODES FOR BACKHAUL-LINK FAILURE REPORTING IN INTEGRATED ACCESS

CROSS-REFERENCE TO RELATED APPLICATIONS

This application is a Submission Under 35 U.S.C. § 371 for U.S. National Stage Patent Application of International Application No.: PCT/EP2020/053641, filed Feb. 12, 2020 entitled "USING ALTERNATIVE PATHS OF DESCENDANT NODES FOR BACKHAUL-LINK FAILURE REPORTING IN INTEGRATED ACCESS," which claims priority to U.S. Provisional Application No. 62/805,015, filed Feb. 13, 2019, entitled "USING ALTERNATIVE PATHS OF DESCENDANT NODES FOR BACKHAUL-LINK FAILURE REPORTING IN INTEGRATED ACCESS," the entireties of both of which are incorporated herein by reference.

TECHNICAL FIELD

The present disclosure relates to wireless communications, and in particular, to recovery from a radio link failure in a backhaul network.

BACKGROUND

Integrated Access Backhaul Networks

The Third Generation Partnership Project (3GPP) is studying potential solutions for efficient operation of integrated access and wireless access backhaul in New Radio (NR) (NR is also known as "5G"), referred to as the Integrated Access Backhaul (IAB) network.

IAB strives to reuse existing functions and interfaces defined for access. In particular, Mobile-Termination (MT), gNode B distributed unit (gNB-DU), gNB-Central Unit (CU), User Plane Function (UPF), Access and Mobility Management Function (AMF) and Session Management Function (SMF) as well as the corresponding interfaces NR Uu (between MT and gNB), F1, NG, X2 and N4, are used as baselines for the IAB architectures. Modifications or enhancements to these functions and interfaces for the support of IAB will be explained in the context of the architecture discussion. Additional functionality such as multi-hop forwarding is included in the architecture discussion as it may be helpful for the understanding of IAB operation and since certain aspects may require standardization.

The Mobile-Termination (MT) function has been defined as a component of the Mobile Equipment. In the context of this study, MT is referred to as a function residing on an IAB-node that terminates the radio interface layers of the backhaul Uu interface toward the IAB-donor or other IAB-nodes.

FIG. 1 shows a reference diagram for IAB in standalone mode, which contains one IAB-donor and multiple IAB-nodes. The IAB-donor is treated as a single logical node that includes a set of functions such as gNB-DU, gNB-CU-Control Plane (CP), gNB-CU-User Plane (UP) and potentially other functions. In a deployment, the IAB-donor can be split according to these functions, which can all be either collocated or non-collocated as allowed by 3GPP Next Generation Radio Access Network (NG-RAN) architecture. IAB-related issues may arise when such split is exercised. Also, some of the functions presently associated with the IAB-donor may eventually be moved outside of the donor in case it becomes evident that they do not perform IAB-specific tasks.

Few potential architectures to implement IAB have been identified (the reader is referred to 3GPP Technical Report (TR) 38.874 for the details of these architectures). These architectures are shown in FIGS. 2-6. After analyzing the differences between these options during the study item phase of IAB specifications, the 3GPP has decided to standardize architecture 1a for technical release-16. The proposed UP and CP protocol stacks are shown in FIGS. 7 and 8.

As shown above, the chosen protocol stacks reuse the current CU-Distributed Unit (DU) split specification in 3GPP release-15, where the full F1-U (General Packet Radio Service Tunneling Protocol (GTP)-U/user datagram protocol (UDP)/Internet protocol (IP)) is terminated at the IAB node (like a normal distributed unit (DU)) and the full F1-C (F1-application protocol (AP)/stream transmission control protocol (SCTP)/IP) is also terminated at the IAB node (like a normal DU). In the above cases, Network Domain Security (NDS) has been employed to protect both user plane (UP) and control plane (CP) traffic (IPsec in the case of UP, and datagram transport layer security (DTLS) in the case of CP). IPsec could also be used for the CP protection instead of DTLS.

One commonality between the CP and UP protocol stacks is that a new layer, called an adaptation layer, has been introduced in the intermediate IAB nodes and the IAB donor, which is used for routing of packets to the appropriate downstream/upstream node. The adaptation layer is also used for mapping the user equipment (UE) bearer data to the proper backhaul radio link control (RLC) channel (and also between backhaul radio link control (RLC) channels in intermediate IAB nodes) to satisfy the end to end quality of service (QoS) requirements of bearers.

Some Examples of the Operation of the Transmitter and Receiver Side Follow.

Packet Data Convergence Protocol (PDCP)

The PDCP entity receives PDCP service data units (SDUs) from higher layers and these SDUs are assigned a Sequence Number (SN) and delivered to lower layers (i.e., RLC). The discard timer is also started at the time a PDCP SDU is received. When the discard timer expires, the PDCP SDU is discarded and a discard indication is sent to lower layers. RLC, when possible, will then discard the RLC SDU.

In the receiver side, the PDCP entity starts the t-reordering when it receives packets that are out of order. When the t-reordering expires, the PDCP entity updates the variable RX_DELIV which indicates the value of the first PDCP SDU not delivered to the upper layers i.e., it indicates the lower side of the receiving window.

Radio Link Control (RLC)

In the transmitter side, when an RLC SDU is received from higher layers, a sequence number (SN) is associated to it. The transmitter may set the poll bit to request the receiver side to transmit a status report. When this is done, the t-poll Retransmit is started. Upon expiration of this timer, the transmitter will again set the poll bit and may further retransmit those packet data units (PDUs) which were waiting to be acknowledged.

The receiver, on the other hand, will start the t-reassembly when RLC PDUs are not received in sequence. The function is similar to the t-reordering in PDCP. The timer is started when there is an SN gap, i.e., an RLC PDU is missing. When t-reassembly expires, for acknowledge mode (AM), the receiver will transmit a status report to trigger a retransmission in the transmitter side.

Media Access Control (MAC)

When the UE has data to be transmitted, it will request a grant by means of the scheduling request (SR) or buffer status report (BSR).

Backhaul Link Failure

Backhaul Link Failure Recovery Scenarios

For various reasons, different scenarios of backhaul-link failure may occur in IAB networks. In the following, some example scenarios are illustrated for backhaul-link failure. Examples of such scenarios are depicted with an illustrative figure (FIGS. 9-11) aimed at establishing a route between IAB-donor and IAB-node D after back haul (BH)-link failure, where:

Nodes A1 and A2 are IAB-donor nodes; nodes B to H are IAB-nodes;

The thin dashed lines represent the established connection between two nodes;

The arrows represent the established route after BH-link failure, and the thick dashed line represents the new established connection.

Scenario A

In this scenario (depicted in FIG. 9), the backhaul-link failure occurs between an upstream IAB-node (e.g., IAB-node C) and one of its parent IAB-nodes (e.g., IAB-node B), where the upstream IAB-node (IAB-node C) has an additional link established to another parent node (IAB-node E).

Scenario B

In this scenario (depicted in FIG. 10), the backhaul-link failure occurs between an upstream IAB-node (e.g. IAB-node C) and all its parent IAB-nodes (e.g., IAB-nodes B and E). The upstream IAB-node (IAB-node C) has to reconnect to a new parent node (e.g., IAB-node F), and the connection between IAB-node F and IAB-node C is newly established).

Scenario C

In this scenario (depicted in FIG. 11), the backhaul-link failure occurs between IAB-node C and IAB-node D. IAB-node D has to reconnect to the new IAB-donor (e.g., IAB-donor A2) via a new route.

Principal Steps of BH RLF Recovery in Architecture 1*a*

In the following discussion, three scenarios of backhaul RLF and subsequent recovery are discussed:

Scenario 1: Recovery via an existing BH link (FIGS. 12 and 13).

Scenario 2: Recovery via a newly established BH link using the same IAB-donor CU (FIGS. 14 and 15).

Scenario 3: Recovery via a newly established BH link using a different IAB-donor CU (FIGS. 16 and 17).

In scenario 1 (FIGS. 12 and 13), the MT on IAB-node-5 is dual-connected to IAB-node-3 and IAB-node-4, which hold the master cell group (MCG) and the secondary cell group (SCG), respectively. Two adaptation layer routes have been established, one referred to as Adapt route A via IAB-node-3, and the other referred to as Adapt route B via IAB-node 4. It is assumed that Adapt route A is used for backhauling of access traffic for the UE attached to IAB-node-5. The radio link failure (RLF) is further assumed to occur on the link to the MCG on IAB-node-3. The SCG link to IAB-node-5 may further be in a radio resource control (RRC)-inactive state.

FIG. 13 shows one example for the recovery procedure for scenario 1:

1. The MT on IAB-node-5 conducts radio link monitoring (RLM) on both links and discovers RLF on the link to MCG on IAB-node-3.
2. The MT may report MCG RLF over SCG radio resource control (RRC) to the Central Unit (CU)-Control Plane (CP) using NR dual connectivity (DC) procedures. This step implies that such reporting is supported by NR DC. In case the SCG link is in RRC inactive state, the MT will resume the RRC connection on this link.
3. The CU-CP migrates the MT's MCG from IAB-node-3 to IAB-node-4 using NR DC procedures. This step implies that such procedure is supported by NR DC.

B. The CU-CP migrates the F1*-U connection with the distributed unit (DU) on IAB-node-5 to Adapt route B. It further uses Adapt route B for F1*-C signaling with the DU on IAB-node-5. This step also has to be applied to all descendent IAB-nodes of IAB-node-5.

C. The CU-CP may release Adapt route A.

After backhaul (BH) RLF recovery, the CU-CP can add topologically redundant BH links and routes. Note that while the Scenario 1 recovery procedure is presented for the case of multi-connectivity of single-MT IAB-nodes, it is expected that a similar solution is applicable to the case of multi-connected multi-MT IAB-nodes.

In scenario 2 (FIGS. 14 and 15), the MT on IAB-node-5 is singly connected to IAB-node-3. One adaptation layer route has been established via IAB-node-3 referred to as Adapt route A. The RLF is assumed to occur on the link between IAB-node-5 and its parent node IAB-node-3.

FIG. 15 shows one example of the recovery procedure for scenario 2:

1. The MT on IAB-node-5 conducts RLM on the link to its parent and discovers the RLF.
2. The MT on IAB-node-5 synchronizes with the DU on IAB-node-4 and performs a random access channel (RACH) procedure.
3. The MT on IAB-node-5 initiates RRC-Connection-Reestablishment, leveraging existing NR procedures. Since the central unit (CU) is the same as before, it has all the context of this MT. IAB-node-5 discovers that the CU has not changed through a CU-specific identifier provided to the MT. Consequently, IAB-node-5's DU can keep the existing F1-application protocol (AP) with the CU.

A. The CU-CP establishes Adapt route B to IAB-node-5 via IAB-donor DU2, IAB-node-2 and IAB-node-4.

B. The CU-CP migrates F1*-U with the DU on IAB-node-5 to Adapt route B. It further uses Adapt route B for F1*-C signaling with the DU on IAB-node-5. This step also should be applied to all descendent IAB-nodes of IAB-node-5.

C. The CU-CP may release Adapt route A.

After BH RLF recovery, the CU-CP can add topologically redundant BH links and routes.

In scenario 3 (FIGS. 16 and 17), the MT on IAB-node-5 is single-connected to IAB-node-3. One adaptation layer route has been established via IAB-node-3 referred to as Adapt route A. The RLF is assumed to occur on the link between IAB-node-5 and its parent node IAB-node-3.

FIG. 17 shows one example for the recovery procedure for scenario 3:

1. The MT on IAB-node-5 conducts RLM on the link to its parent and discovers RLF.
2. The MT on IAB-node-5 synchronizes with the DU on IAB-node-4 and performs a random access channel (RACH) procedure.
3. The DU on IAB-node-5 discontinues service since it has lost F1*-C connectivity to gNB-CU-1.
4. The MT on IAB-node-5 initiates RRC-Connection-Reestablishment, leveraging existing NR procedures. Since the CU is different, it may or may not be able to fetch the context of this MT. IAB-node-5 discovers that the CU has changed from a CU-specific identifier provided to the MT. Consequently, IAB-node-5 has to restart F1-AP from its DU to the new CU.
A. The new CU-CP establishes Adapt route B to IAB-node-5 via IAB-donor DU2, IAB-node-2 and IAB-node-4.
B. The DU on IAB-node-5 initiates a new F1*-C connection to the new CU-CP. This procedure is the same as IAB-node setup phase 2.2 described in section 9.3 of 3GPP Technical Report (TR) 38.874. The DU will obtain a new configuration during that procedure, e.g., a new physical cell identity (PCI). After that, the DU resumes service.
5. The UE determines RLF with the prior DU entity on IAB-node-5.
6. The UE discovers and selects the new DU entity on IAB-node-5.
7. The UE conducts a random access procedure with this new DU entity on IAB-node-5.
8. The UE initiates RRC-Connection-Reestablishment with the new CU-CP, leveraging NR procedures. The new CU-CP may or may not be able to fetch the UE's context from the old CU-CP. The new CU-CP will set up F1*-U for the UE with the new DU on IAB-node-5 following NR procedures.
C. The CU-CP releases Adapt route A. This release may be based on F1*-C failure detection.

After BH RLF recovery, the CU-CP can add topologically redundant BH links and routes.

Steps 3, 4, A, B, C and potentially steps 1 and 2 also may have to be applied by all descendant IAB-nodes of IAB-node-5. Further, steps 4, 5 and 6 may also be applied by all UEs connected to descendant IAB-nodes of IAB-node-5.

As these steps show, the BH RLF recovery procedure via a new backhaul link with a different CU may cause multiple subsequent RLFs for descendant IAB-nodes and UEs. This may cause long service interruption for UEs. Further enhancements may be needed to reduce this service interruption.

Downstream Notification of BH RLF in Architecture 1a

When the IAB-node observes RLF on its parent link, it cannot provide further backhaul service to downstream IAB-nodes. Also, child IAB-nodes cannot further serve their descendant IAB-nodes. One example is shown in FIG. 18, where IAB-node-5 observes RLF in the link to its parent IAB-node-3 and subsequently cannot provide backhaul service to its child node, i.e., IAB-node-6.

While the IAB-node observing RLF is aware about backhaul connectivity loss, the descendent IAB-nodes do not have explicit means to identify this upstream backhaul connectivity loss. In case the RLF can be recovered swiftly, as can be expected for BH-RLF-recovery scenario 1, there may be no need to explicitly inform the descendant IAB-nodes about the temporary BH connectivity loss. When the BH RLF cannot be recovered swiftly, it may be beneficial to release backhaul connectivity to descendant IAB-nodes so that they themselves can seek means to recover from the BH RLF. For this purpose, three options may be considered:

Option 1: The IAB-node DU discontinues service. Consequently, the child nodes will also determine BH RLF and follow through the above procedures to recover its link to the backhaul network.

Option 2: The IAB-node DU explicitly alerts child IAB-nodes about the upstream RLF. Child IAB-nodes receiving this alert can forward the alert further downstream. Each IAB-node receiving such alert initiates BH-RLF recovery as discussed above.

Option 3: Every IAB-node can regularly share information on, e.g., BH quality, to its child or parent IAB-nodes. In this manner, downstream or upstream RLF can be sensed without taking explicit actions.

In case a descendant IAB-node (such as IAB-node 6) can recover from such an upstream RLF by using one of the procedures described above, its DU can provide BH RLF-recovery for former ancestor nodes (such as IAB-node 5).

Efficient Backhaul Link Failure Recovery

The recovery procedure for backhaul failure scenarios 2 and 3 includes identifying an alternate parent node and establishing/re-establishing the control plane and user plane through the alternate parent node. However, identifying and attaching to an alternate node can take a significant amount of time and also may not always be possible, e.g., due to lost connectivity with the donor CU or due to lack of alternative parent nodes (especially in millimeter-wave deployments). It may be useful to consider how the IAB network is reorganized when there is a backhaul failure in a way that minimizes interruption time of connection with the IAB-donor.

FIG. 19 illustrates a scenario of a backhaul failure on one of the links in an IAB network. In such scenarios, many IAB-nodes and UEs may be left without a connection to the IAB-donor and may need to find alternate parent nodes. Downstream IAB-nodes (e.g., IAB-nodes 4, 6 in FIG. 19) and the IAB-donor may need to be informed of the backhaul failure. Furthermore, if all the affected IAB-nodes simultaneously try to find alternate parent nodes, the resulting topology may be inefficient.

The following can be considered for recovery from backhaul failures:

Information can be provided to downstream IAB-nodes regarding backhaul failure including a list of nodes that cannot serve as parent nodes due to the backhaul failure.

Preparation of alternative backhaul links and routes in advance (i.e., before occurrence of RLF).

As discussed above, there are different backhaul failure scenarios and different mechanisms to recover from them. The problem is further illustrated in FIG. 20, where several IAB nodes may be left disconnected from the IAB-donor (Node A1) due to a failure of a backhaul link on the path to the donor where IAB nodes B, C, D, K, N and P may be considered to be on an established communication path to donor IAB node A1 while other nodes such as IAB node O, H, J, etc. are not on this established communication path. For the scenario shown in FIG. 16, the failure of the backhaul link of IAB node C may cause the descendant nodes of IAB node C (D, K, N, and P) to be disconnected as well.

As discussed above, mechanisms are already proposed where the affected IAB node (i.e. node C) can send indications to its descendant IAB nodes. The descendant IAB nodes can then try to find alternate parent nodes. However, this may lead to a chaotic situation where several nodes are trying to find alternate paths and increases the overall signaling load (and also several UEs may end up being impacted, as data flow may be interrupted during the path switching of all these IAB nodes).

In the failure recovery scenarios described above, it may always be the affected IAB node (i.e. node C) that initiate reconnection with the IAB-donor by employing either existing connections to establish the new route or new alternate parent nodes/paths had to be established to enable the new path. However, in some situations, this process (identifying and attaching to alternative parent node) can take a significant amount of time and may even not be possible due to unavailability of alternative parent node(s). On the other hand, some of the affected descendant nodes (e.g. nodes D, K, and P shown in FIG. 20) can have alternate paths to the IAB-donor.

SUMMARY

Some embodiments advantageously provide methods, systems, and apparatuses for recovery from a radio link failure in a backhaul network.

Methods to be performed by an IAB node (as referred to as a first IAB node in one or more embodiments and/or examples) upon detecting a link failure in its backhaul link to its parent IAB node are proposed:

The IAB node sends an indication to a subset of its child IAB nodes that its backhaul link has failed.
  This can be done in a dedicated manner (i.e., one by one to each child IAB node via a MAC CE, PDCP control PDU, etc.) or broadcast (e.g., in a SIB, system information block).
  The receiving nodes can use the information to pause or throttle (e.g. reduce data transmission).
The indication can include a report that is to be forwarded to the donor CU
  The report can be sent also in a separate message than the first indication
  The report can contain information such as the reason for the link failure, latest measurement reports from the first IAB node. etc.
If a child IAB node has an alternate path to the donor, the child IAB forwards that information towards the CU via that path.
  If not, the child IAB node can pass the report to its children and the process is repeated hierarchically.
When the CU receives the report, it may use the information contained therein (i.e. measurement report), to decide the best alternate parent for the IAB node
  The CU prepares an RRC Reconfiguration message to the IAB node
  The CU sends it to the child node that has forwarded the failure report
The child IAB node, upon getting the RRC reconfiguration message from the CU, may forward it to the first IAB node
The first IAB node applies the RRC reconfiguration and connects to the target indicated in the reconfiguration message.

According to one aspect of the disclosure, a child integrated access backhaul (IAB) node configured to communicate with a first parent IAB node and a descendant IAB node over a backhaul network is provided. The child IAB node includes processing circuitry configured to: detect a backhaul link failure between the child IAB node and the first parent IAB node; in response to the detected backhaul link failure, cause transmission of a radio link failure indication to the descendant IAB node; receive signaling indicating for the child IAB node to connect to a second parent IAB node; and modify network topology at least in part by connecting to the second parent IAB node.

According to one or more embodiments of this aspect, the radio link failure indication is configured to cause each descendant IAB node in an established communication path receiving the radio link failure indication to modify data transmission and remain on the established communication path to the child IAB node. According to one or more embodiments of this aspect, the modifying of data transmission includes limiting at least one of a packet data convergence protocol, PDCP, process, radio link control, RLC, process and medium access control, MAC, process. According to one or more embodiments of this aspect, the modifying of data transmission includes one of: at least temporarily pausing data transmission; and at least temporarily reducing a data transmission rate. According to one or more embodiments of this aspect, the transmission of the radio link failure indication to the descendant IAB node includes one of broadcasting the radio link failure indication to the descendant IAB node and transmitting the radio link failure indication to the descendant IAB node via dedicated signaling.

According to one or more embodiments of this aspect, the radio link failure indication is a failure report that indicates at least one of: a cause of the detected backhaul link failure; IAB node identification; failure report identifier; backhaul link failure time; and results of measurements performed by the child IAB node. According to one or more embodiments of this aspect, the radio link failure indication is a failure report that includes results of measurements performed by the child IAB node where the results of the measurements indicate at least one discoverable parent IAB node. According to one or more embodiments of this aspect, the signaling is RRC signaling that is received from the descendant IAB node where the RRC signaling includes an RRC reconfiguration message.

According to another aspect of the disclosure, a method implemented by a child integrated access backhaul (IAB) node that is configured to communicate with a first parent IAB node and a descendant IAB node over a backhaul network is provided. A backhaul link failure between the child IAB node and the first parent IAB node is detected. In response to the detected backhaul link failure, transmission is caused of a radio link failure indication to the descendant IAB node. Signaling indicating for the child IAB node to connect to a second parent IAB node is received. Network topology is modified at least in part by connecting to the second parent IAB node.

According to one or more embodiments of this aspect, the radio link failure indication is configured to cause each descendant IAB node in an established communication path receiving the radio link failure indication to modify data transmission and remain on the established communication path to the child IAB node. According to one or more embodiments of this aspect, the modifying of data transmission includes limiting at least one of a packet data convergence protocol, PDCP, process, radio link control, RLC, process and medium access control, MAC, process. According to one or more embodiments of this aspect, the modi-fying of data transmission includes one of: at least temporarily pausing data transmission; and at least temporarily reducing a data transmission rate. According to one or more embodiments of this aspect, the transmission of the radio link failure indication to the descendant IAB node includes one of broadcasting the radio link failure indication to the descendant IAB node and transmitting the radio link failure indication to the descendant IAB node via dedicated signaling. According to one or more embodiments of this aspect, the radio link failure indication is a failure report that indicates at least one of: a cause of the detected backhaul link failure; IAB node identification; failure report identifier; backhaul link failure time; and results of measurements performed by the child IAB node.

According to one or more embodiments of this aspect, the radio link failure indication is a failure report that includes results of measurements performed by the child IAB node where the results of the measurements indicates at least one discoverable parent IAB node. According to one or more embodiments of this aspect, the signaling is RRC signaling that is received from the descendant IAB node where the RRC signaling includes an RRC reconfiguration message.

According to another aspect of the disclosure, a donor integrated access backhaul (IAB) node in communication with a first parent IAB node, a child IAB node and at least one descendant IAB node over a backhaul network is provided. The first parent IAB node is in communication with the child IAB node and the descendant IAB node. The donor IAB node includes processing circuitry configured to: receive a radio link failure indication from one of the at least one descendent IAB nodes where the radio link failure indication indicates a radio link failure between the child IAB node and the first parent IAB node; determine a second parent IAB node for the child IAB node to connect to based at least in part on the radio link failure indication; and cause transmission of signaling to the child IAB node, the signaling indicating for the child IAB node to modify a network topology at least in part by connecting to the second parent IAB node.

According to one or more embodiments of this aspect, the radio link failure indication is configured to cause each descendant IAB node in an established communication path receiving the radio link failure indication to modify data transmission and remain on the established communication path to the child IAB node. According to one or more embodiments of this aspect, the modifying of data transmission includes limiting at least one of a packet data convergence protocol, PDCP, process, radio link control, RLC, process and medium access control, MAC, process. According to one or more embodiments of this aspect, the modifying of data transmission includes one of: at least temporarily pausing data transmission; and at least temporarily reducing a data transmission rate.

According to one or more embodiments of this aspect, the radio link failure indication is a failure report that indicates at least one of: a cause of the detected backhaul link failure; IAB node identification; failure report identifier; backhaul link failure time; and results of measurements performed by the child IAB node. According to one or more embodiments of this aspect, the radio link failure indication is a failure report including results of measurements performed by the child IAB node, the results of the measurements indicating at least one discoverable parent IAB node. According to one or more embodiments of this aspect, the signaling is RRC signaling that includes an RRC reconfiguration message. According to one or more embodiments of this aspect, the at least one descendant IAB node is a plurality of descendant IAB nodes.

According to another aspect of the disclosure, a method implemented by a donor integrated access backhaul (IAB) node that is in communication with a first parent IAB node, a child IAB node and at least one descendant IAB node over a backhaul network is provided. The first parent IAB node is in communication with the child IAB node and the descendant IAB node. A radio link failure indication from one of the at least one descendent IAB node is received. The radio link failure indication indicates a radio link failure between the child IAB node and the first parent IAB node. A second parent IAB node for the child IAB node to connect to is determined based at least in part on the radio link failure indication. Transmission of signaling to the child IAB node is caused. The signaling indicates for the child IAB node to modify a network topology at least in part by connecting to the second parent IAB node.

According to one or more embodiments of this aspect, the radio link failure indication is configured to cause each descendant IAB node in an established communication path receiving the radio link failure indication to modify data transmission and remain on the established communication path to the child IAB node. According to one or more embodiments of this aspect, the modifying of data transmission includes limiting at least one of a packet data convergence protocol, PDCP, process, radio link control, RLC, process and medium access control, MAC, process. According to one or more embodiments of this aspect, the modifying of data transmission includes one of: at least temporarily pausing data transmission; and at least temporarily reducing a data transmission rate.

According to one or more embodiments of this aspect, the radio link failure indication is a failure report that indicates at least one of: a cause of the detected backhaul link failure; IAB node identification; failure report identifier; backhaul link failure time; and results of measurements performed by the child IAB node. According to one or more embodiments of this aspect, the radio link failure indication is a failure report including results of measurements performed by the child IAB node where the results of the measurements indicates at least one discoverable parent IAB node. According to one or more embodiments of this aspect, the signaling is RRC signaling that includes an RRC reconfiguration message. According to one or more embodiments of this aspect, the at least one descendant IAB node is a plurality of descendant IAB nodes.

According to another aspect of the disclosure, a descendant integrated access backhaul (IAB) node in communication with a donor IAB node via at least a first parent IAB node and a child IAB node over a backhaul network is provided. The descendant IAB node includes processing circuitry configured to: receive a radio link failure indication; in response to the radio link failure indication: modify data transmission and remain on an established communication path to the child IAB node; and cause transmission of the radio link failure indication to the donor node; receive signaling from the donor IAB node, the signaling indicating for the child IAB node to modify network topology at least in part by connecting to a second parent IAB node; and cause transmission of the signaling to the child IAB node.

According to one or more embodiments of this aspect, the processing circuitry is further configured to: determine whether an alternate communication path from the descendant IAB node to the donor IAB node is configured; and if the alternate communication path is configured, transmit the radio link failure indication along the alternative communication path to the donor IAB node. According to one or more embodiments of this aspect, the processing circuitry is further configured to: determine whether an alternate communication path from the descendant IAB node to the donor IAB node is configured; and if the alternate communication path is not configured, cause transmission of the radio link failure indication to another descendant IAB node. According to one or more embodiments of this aspect, the modifying of data transmission includes one of: at least temporarily pausing data transmission; and at least temporarily reducing a data transmission rate.

According to one or more embodiments of this aspect, the modifying of data transmission includes limiting at least one of a packet data convergence protocol, PDCP, process, radio link control, RLC, process and medium access control, MAC, process. According to one or more embodiments of this aspect, the radio link failure indication is a failure report destined for a donor IAB node where the failure report indicates at least one of: a cause of the radio link failure; IAB node identification; failure report identifier; backhaul link failure time; and results of measurements performed by the child IAB node. According to one or more embodiments of this aspect, the radio link failure indication is a failure report destined for a donor IAB node where the failure report includes results of measurements performed by the child IAB node where the results of the measurements indicate at least one discoverable parent IAB node.

According to one or more embodiments of this aspect, the signaling is RRC signaling that includes an RRC reconfiguration message. According to one or more embodiments of this aspect, the descendant IAB node is one of: a logically next hop from the first parent IAB node; and at least two logical next hops from the first parent IAB node.

According to another aspect of the disclosure, a method implemented by a descendant integrated access backhaul (IAB) node that is in communication with a donor IAB node via at least a first parent IAB node and a child IAB node over a backhaul network is provided. A radio link failure indication is received. In response to the radio link failure indication: data transmission is modified and the descendant IAB node remains on an established communication path to the child IAB node. Transmission of the radio link failure indication to the donor IAB node is caused. Signaling from the donor IAB node is received where the signaling indicating for the child IAB node to modify network topology at least in part by connecting to a second parent IAB node. Transmission of the signaling to the child IAB node is caused.

According to one or more embodiments of this aspect, a determination is performed whether an alternate communication path from the descendant IAB node to the donor IAB node is configured, and if the alternate communication path is configured, transmission of the radio link failure indication along the alternative communication path to the donor IAB node is caused. According to one or more embodiments of this aspect, a determination is performed whether an alternate communication path from the descendant IAB node to the donor IAB node is configured. If the alternate communication path is not configured, transmission of the radio link failure indication to another descendant IAB node is caused. According to one or more embodiments of this aspect, the modifying of data transmission includes one of at least temporarily pausing data transmission, and at least temporarily reducing a data transmission rate.

According to one or more embodiments of this aspect, the modifying of data transmission includes limiting at least one of a packet data convergence protocol, PDCP, process, radio link control, RLC, process and medium access control, MAC, process. According to one or more embodiments of this aspect, the radio link failure indication is a failure report destined for a donor IAB node where the failure report indicates at least one of: a cause of the radio link failure; IAB node identification; failure report identifier; backhaul link failure time; and results of measurements performed by the child IAB node. According to one or more embodiments of this aspect, the radio link failure indication is a failure report destined for a donor IAB node where the failure report includes results of measurements performed by the child IAB node and where the results of the measurements indicating at least one discoverable parent IAB node. According to one or more embodiments of this aspect, the signaling is RRC signaling that includes an RRC reconfiguration message.

According to one or more embodiments of this aspect, the descendant IAB node is one of: a logically next hop from the first parent IAB node; and at least two logical next hops from the first parent IAB node.

BRIEF DESCRIPTION OF THE DRAWINGS

A more complete understanding of the present embodiments, and the attendant advantages and features thereof, will be more readily understood by reference to the following detailed description when considered in conjunction with the accompanying drawings wherein:

FIGS. 7 and 8 illustrate user plane (UP) and control plane (CP) protocol stacks for the standardized architecture shown in FIG. 2;

FIGS. 12 and 13 illustrate recovery via an existing BH link;

FIGS. 14 and 15 illustrate recovery via a newly established BH link using the same IAB donor central unit (CU);

FIG. 23 is a flowchart illustrating exemplary methods implemented in a communication system including a host computer, a network node and a user equipment for executing a client application at a user equipment according to some embodiments of the present disclosure;

FIG. 24 is a flowchart illustrating exemplary methods implemented in a communication system including a host computer, a network node and a user equipment for receiving user data at a user equipment according to some embodiments of the present disclosure;

DETAILED DESCRIPTION

Figure 1:
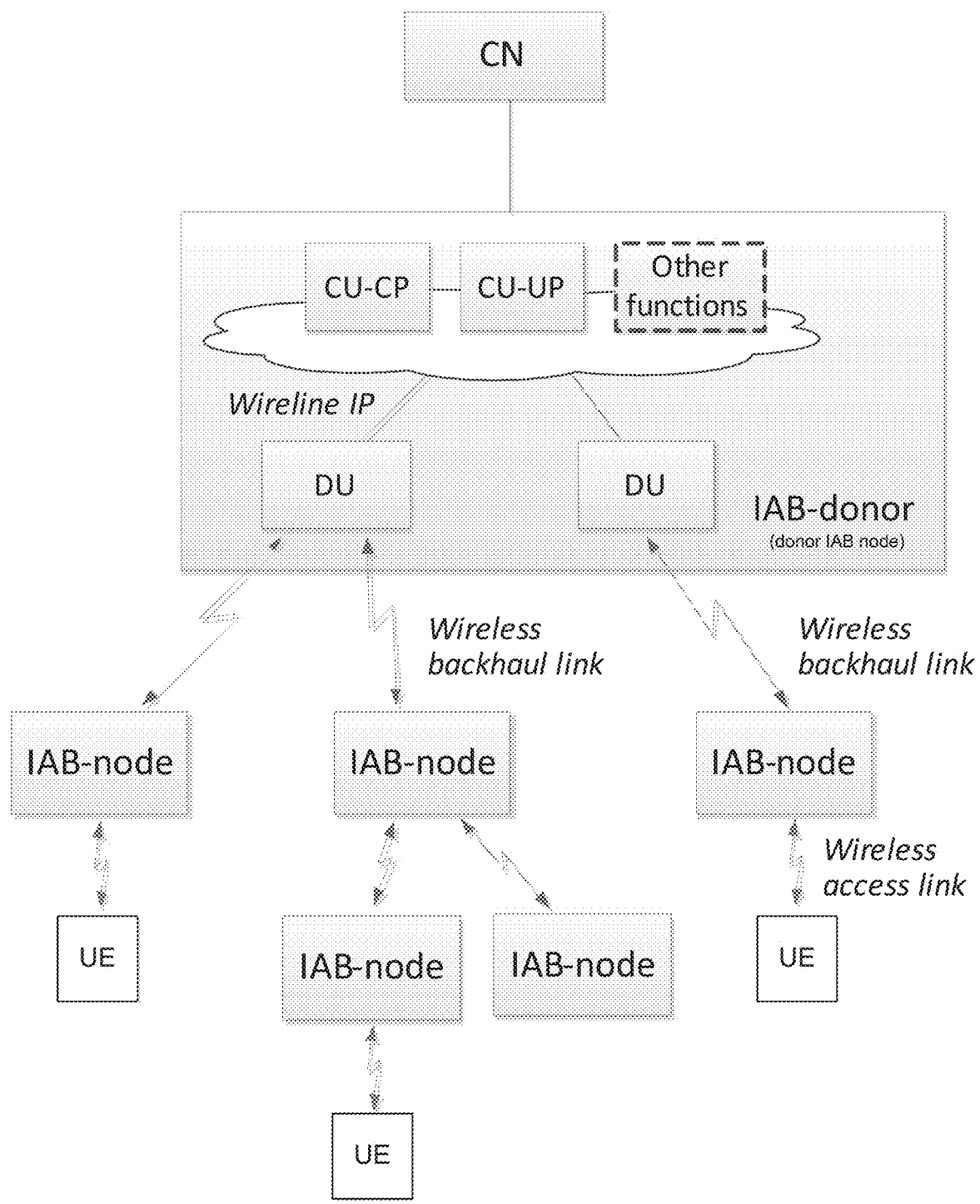
FIG. 1 is a reference diagram for Integrated Access Backhaul (IAB) in a standalone mode.
Figure 2:
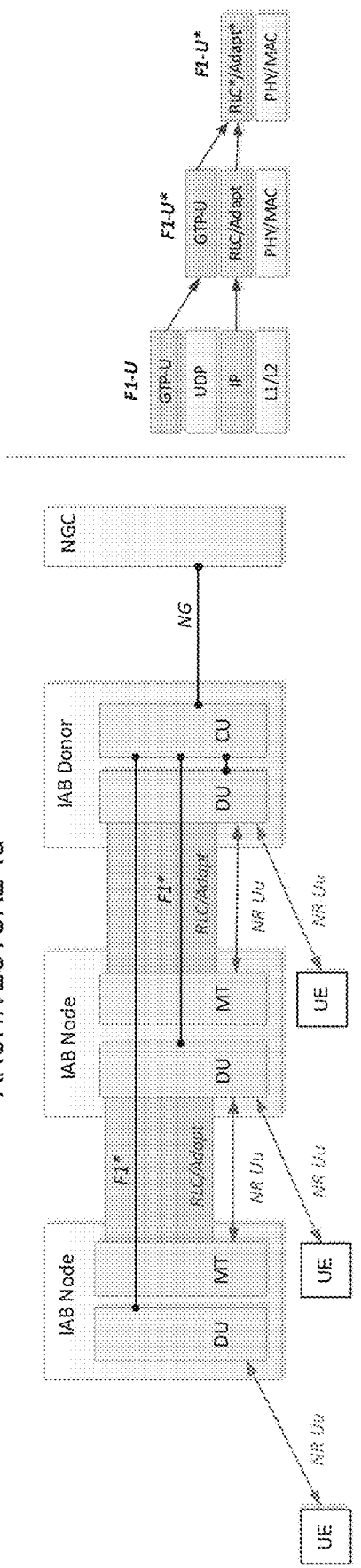
FIGS. 2-6 illustrate architectures to implement IAB identified by the 3GPP.
Figure 3:
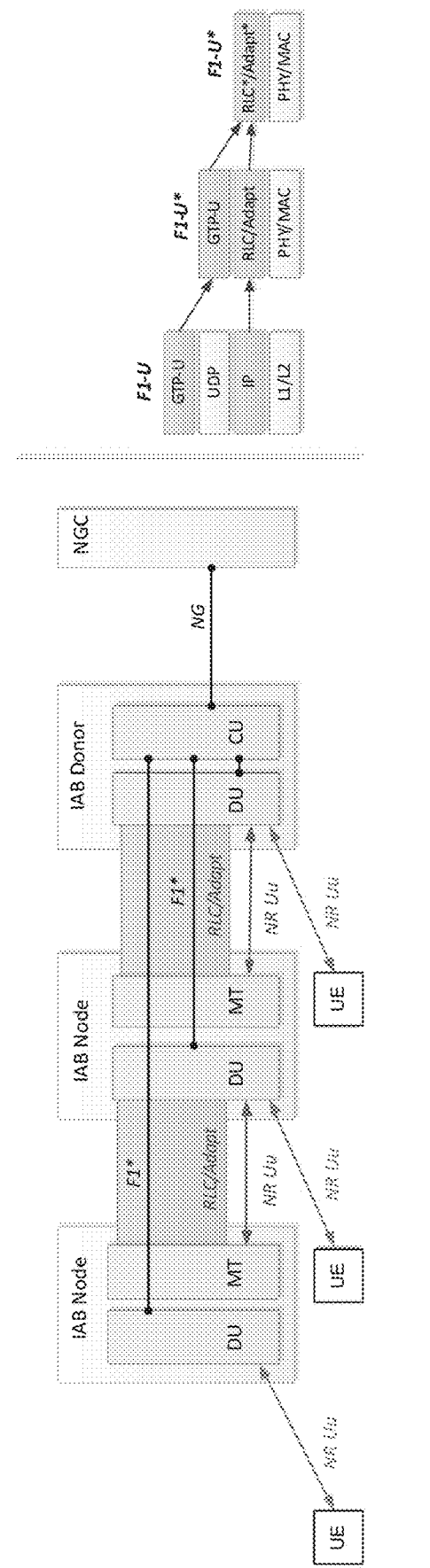
Figures 4, 5, 6:
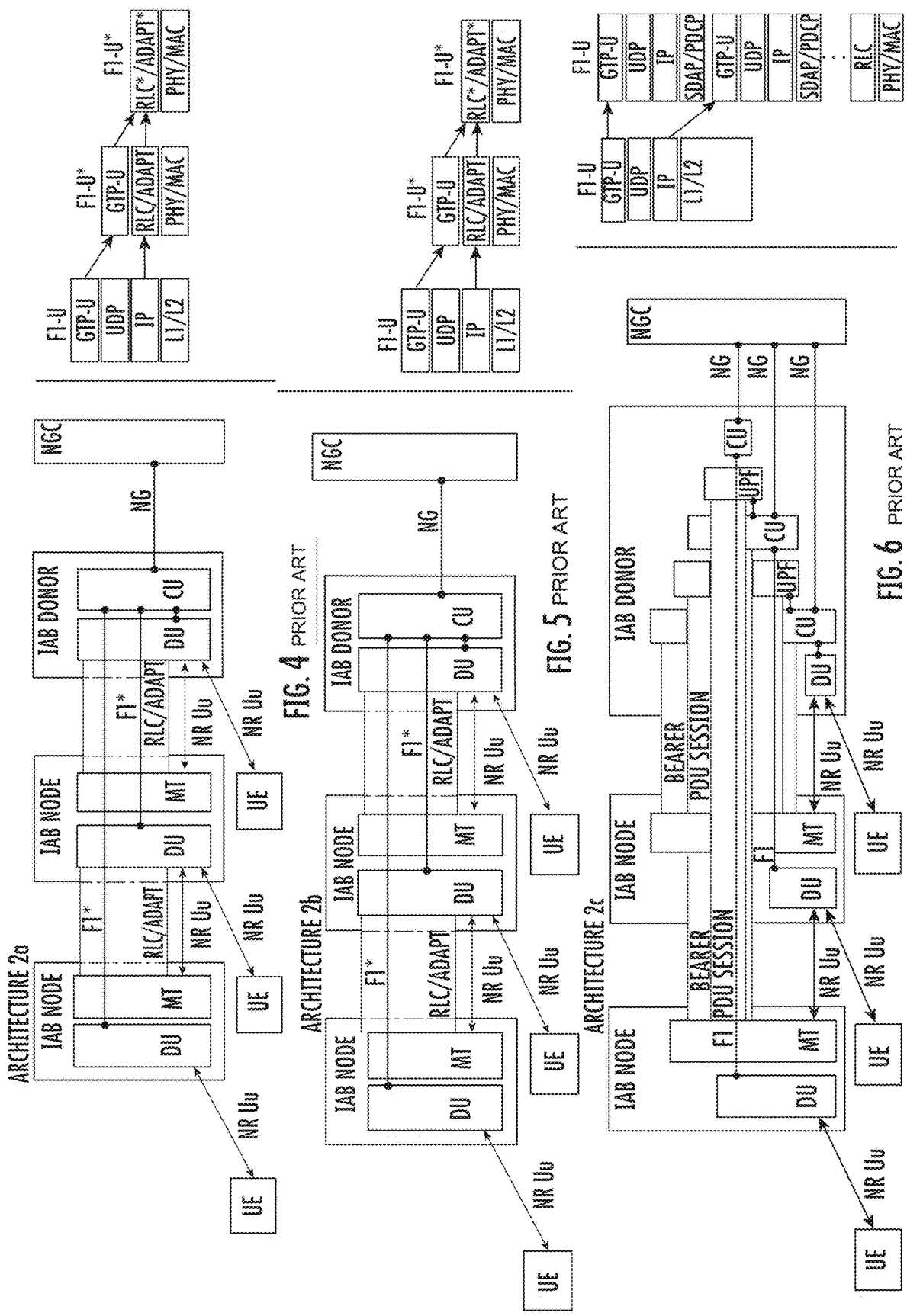
Figure 9:
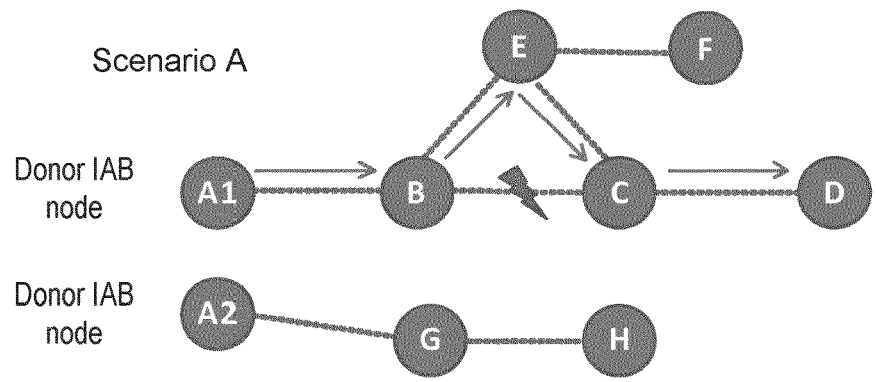
FIGS. 9-11 illustrate example scenarios for backhaul (BH) link failure.
Figure 10:
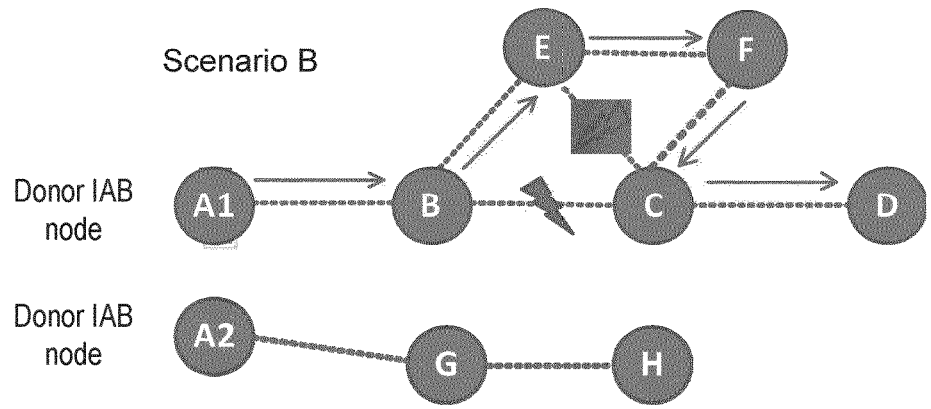
Figure 11:
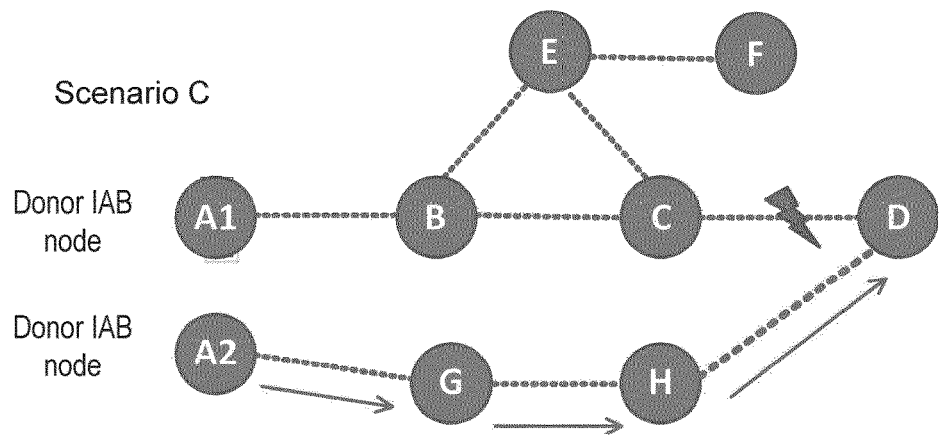
Figure 13:
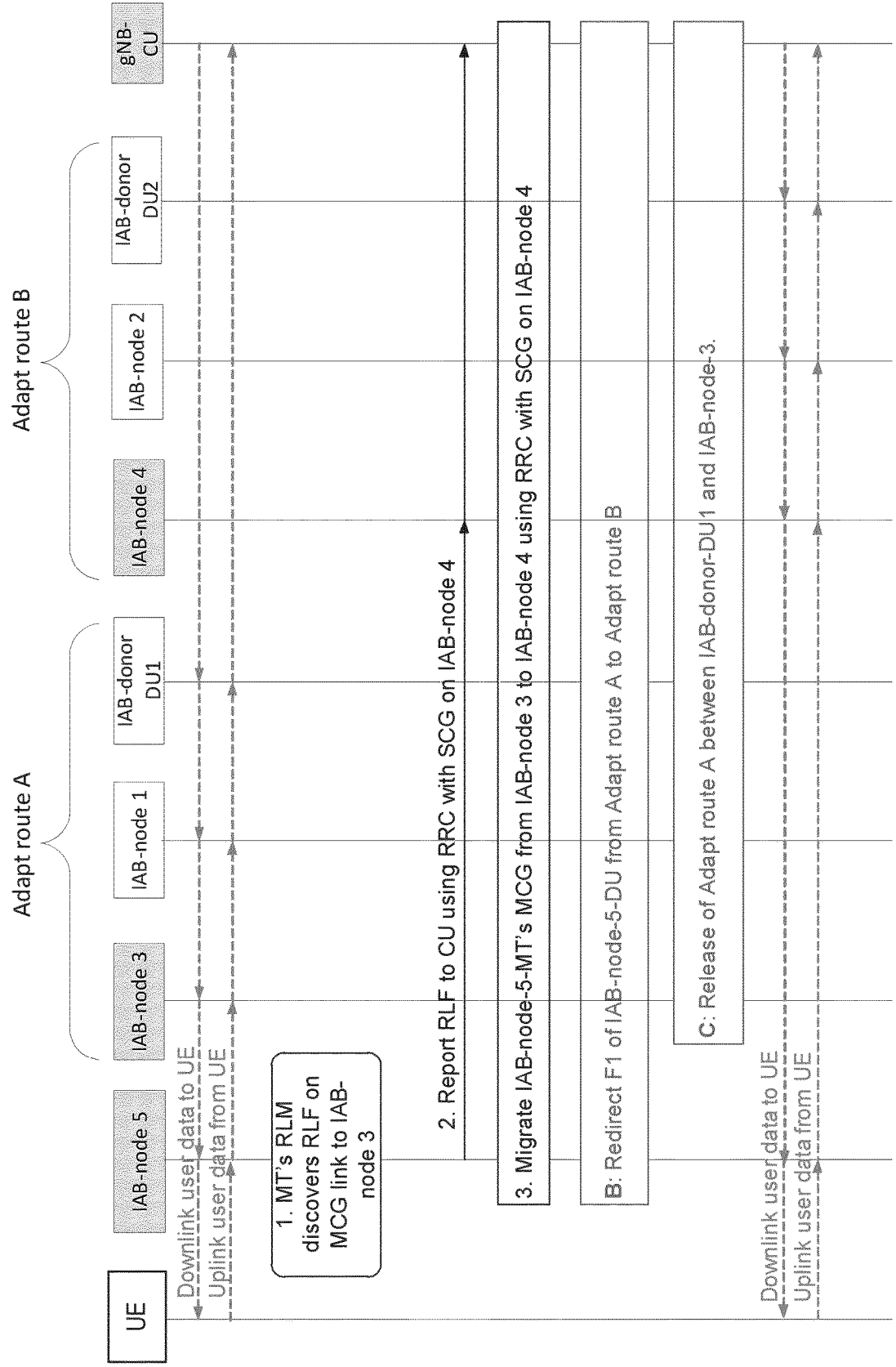
Figure 15:
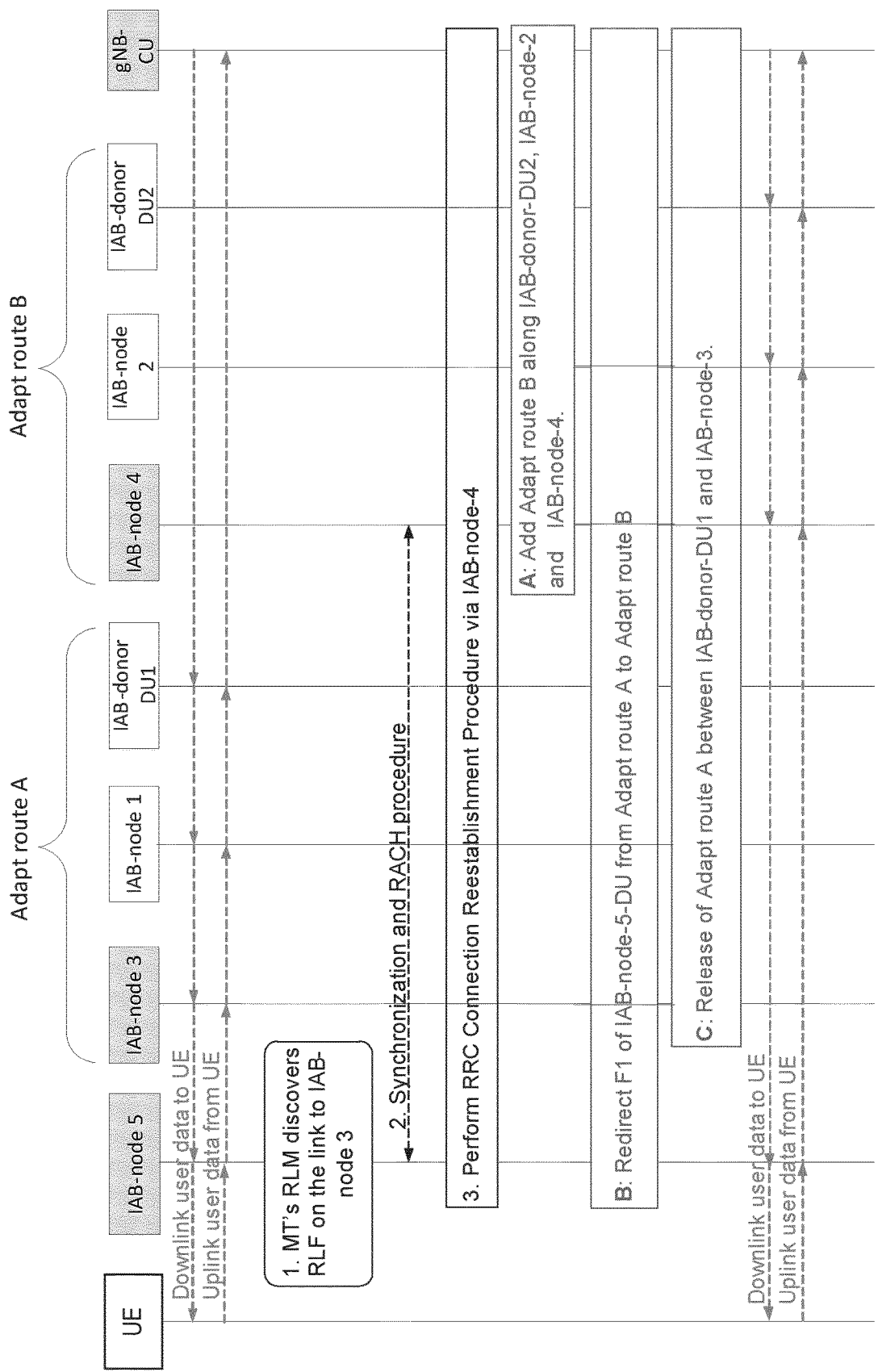
Figure 16:
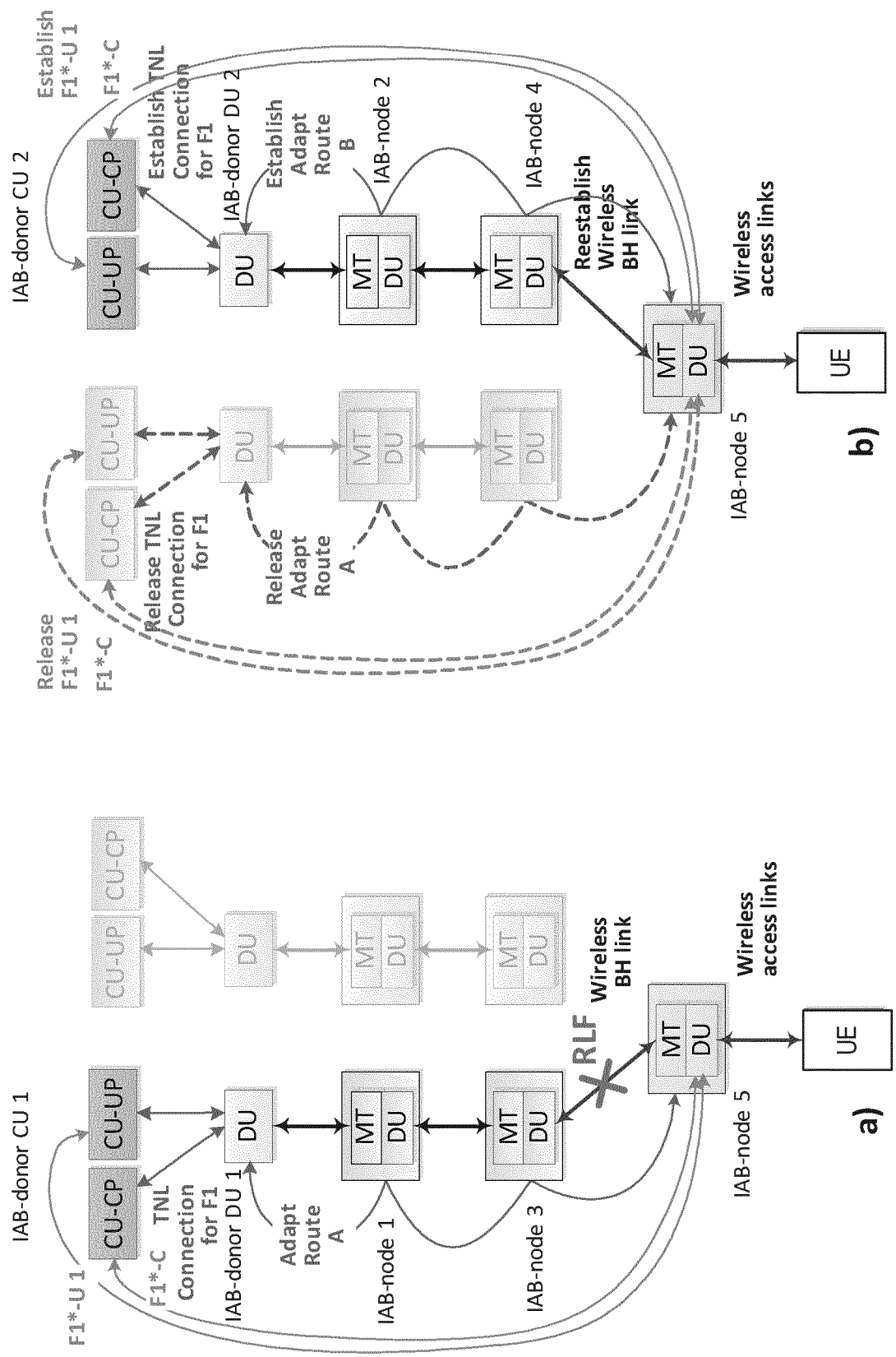
FIGS. 16 and 17 illustrate recovery via a newly established BH link using a different IAB donor CU.
Figure 17:
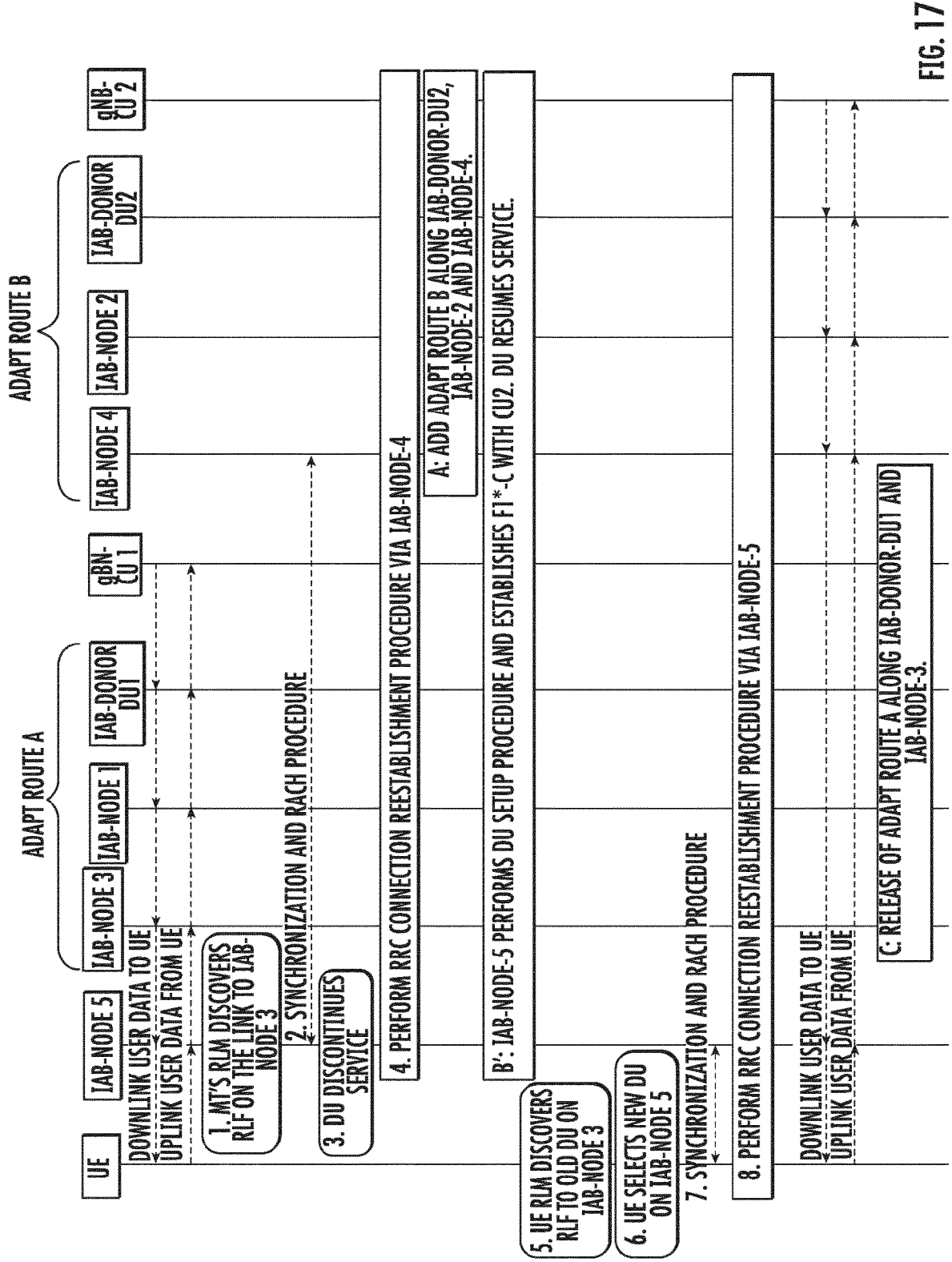
Figure 19:
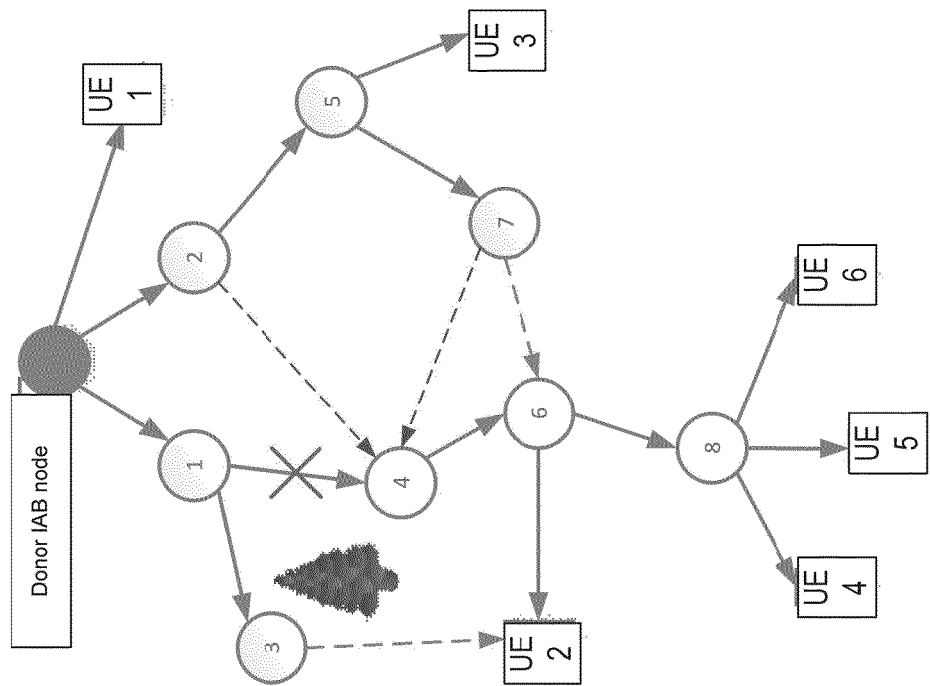
FIG. 19 illustrates a scenario of BH failure on a link in an IAB network.
Figure 18:
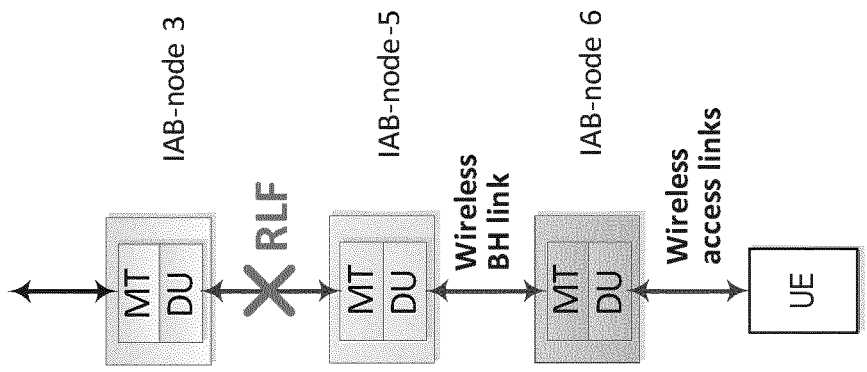
FIG. 18 illustrates an IAB node observing radio link failure (RLF) on its parent link.
Figure 20:
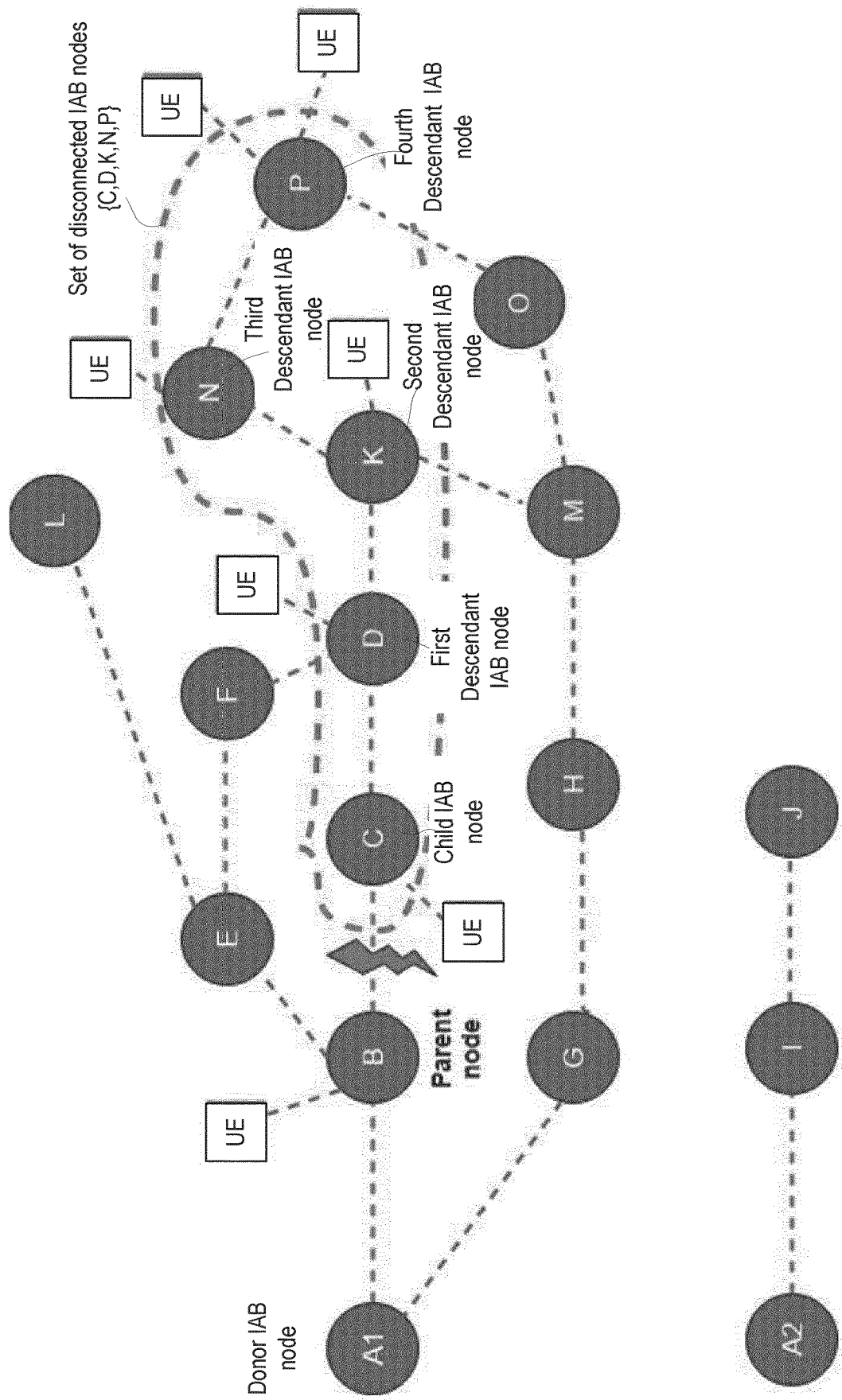
FIG. 20 illustrates an example of several descendant/child IAB nodes disconnected from IAB-donor.

This disclosure provides methods and arrangements to allow an IAB network to recover faster from link failure as compared with other solutions by employing an alternative/redundant path of child/descendent IAB node(s) with the IAB-donor node (also referred to as an donor IAB node) to inform the IAB-donor node about link failure, which may then trigger a topology adaptation procedure to connect the affected IAB node (referred to as the "child IAB node") to a new parent IAB node, as described herein.

In one or more embodiments, a mechanism for faster link failure recovery (as compared with other solutions) in an IAB (relay) network for various scenarios is provided, where a backhaul link failure may leave one or more IAB nodes and UEs disconnected from the IAB-donor, and one or more of the affected descendant/child IAB nodes have a redundant/alternative route to IAB-donor node. One of the descendant IAB nodes (with a redundant/alternative route to IAB-donor node) may be chosen (in case there are more than one) based on a selection criteria to inform the IAB-donor node about the link failure and assist the IAB-donor node in reestablishing connection with the directly affected IAB node.

Before describing in detail exemplary embodiments, it is noted that the embodiments reside primarily in combinations of apparatus components and processing steps related to recovery from a radio link failure in a backhaul network. Accordingly, components have been represented where appropriate by conventional symbols in the drawings, showing only those specific details that are pertinent to understanding the embodiments so as not to obscure the disclosure with details that will be readily apparent to those of ordinary skill in the art having the benefit of the description herein. Like numbers refer to like elements throughout the description.

As used herein, relational terms, such as "first" and "second," "top" and "bottom," and the like, may be used solely to distinguish one entity or element from another entity or element without necessarily requiring or implying any physical or logical relationship or order between such entities or elements. The terminology used herein is for the purpose of describing particular embodiments only and is not intended to be limiting of the concepts described herein. As used herein, the singular forms "a", "an" and "the" are intended to include the plural forms as well, unless the context clearly indicates otherwise. It will be further understood that the terms "comprises," "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

In embodiments described herein, the joining term, "in communication with" and the like, may be used to indicate electrical or data communication, which may be accomplished by physical contact, induction, electromagnetic radiation, radio signaling, infrared signaling or optical signaling, for example. One having ordinary skill in the art will appreciate that multiple components may interoperate and modifications and variations are possible of achieving the electrical and data communication.

In some embodiments described herein, the term "coupled," "connected," and the like, may be used herein to indicate a connection, although not necessarily directly, and may include wired and/or wireless connections. As used herein, the term "topology" refers to the logical arrangement of the network referenced to how data and signaling are moved through the network. Thus, modification of the topology discussed herein refers to a change in the logical relationship of the nodes in the network which might then impact/change the communication path among the nodes.

The term "network node" is used interchangeably with integrated access backhaul (IAB) node and herein can be any kind of network node comprised in a radio network which may further comprise any of base station (BS), radio base station, base transceiver station (BTS), IAB node, base station controller (BSC), radio network controller (RNC), g Node B (gNB), evolved Node B (eNB or eNodeB), Node B, multi-standard radio (MSR) radio node such as MSR BS, multi-cell/multicast coordination entity (MCE), relay node, donor node controlling relay, radio access point (AP), transmission points, transmission nodes, Remote Radio Unit (RRU) Remote Radio Head (RRH), a core network node (e.g., mobile management entity (MME), self-organizing network (SON) node, a coordinating node, positioning node, MDT node, etc.), an external node (e.g., 3rd party node, a node external to the current network), nodes in distributed antenna system (DAS), a spectrum access system (SAS) node, an element management system (EMS), etc. The network node may also comprise test equipment. The term "radio node" used herein may be used to also denote a user equipment (UE), wireless device (WD) such as a wireless device (WD) or a radio network node.

In some embodiments, the non-limiting terms wireless device (WD) or a user equipment (UE) are used interchangeably. The UE herein can be any type of wireless device capable of communicating with a network node or another UE over radio signals, such as wireless device (WD). The UE may also be a radio communication device, target device, device to device (D2D) UE, machine type UE or UE capable of machine to machine communication (M2M), low-cost and/or low-complexity UE, a sensor equipped with UE, Tablet, mobile terminals, smart phone, laptop embedded equipped (LEE), laptop mounted equipment (LME), USB dongles, Customer Premises Equipment (CPE), an Internet of Things (IoT) device, or a Narrowband IoT (NB-IOT) device etc.

Also, in some embodiments the generic term "radio network node" is used. It can be any kind of a radio network node which may comprise any of base station, radio base station, base transceiver station, base station controller, network controller, RNC, evolved Node B (eNB), Node B, gNB, Multi-cell/multicast Coordination Entity (MCE), relay node, access point, radio access point, Remote Radio Unit (RRU) Remote Radio Head (RRH).

An indication generally may explicitly and/or implicitly indicate the information it represents and/or indicates. Implicit indication may for example be based on position and/or resource used for transmission. Explicit indication may for example be based on a parametrization with one or more parameters, and/or one or more index or indices, and/or one or more bit patterns representing the information. It may in particular be considered that control signaling as described herein, based on the utilized resource sequence, implicitly indicates the control signaling type. Transmitting in downlink may pertain to transmission from the network or network node toward the terminal and/or to a descendant network node. Transmitting in uplink may pertain to transmission from the terminal toward a donor network node. Uplink and downlink may be considered communication directions. In some variants, uplink and downlink may also be used to described wireless communication between network nodes, e.g. for wireless backhaul (as described herein) and/or relay communication and/or (wireless) network communication for example between base stations or similar network nodes, in particular communication terminating at such. It may be considered that backhaul and/or relay communication and/or network communication is implemented as a form of sidelink or uplink communication or similar thereto.

Note that although terminology from one particular wireless system, such as, for example, 3GPP LTE and/or New Radio (NR), may be used in this disclosure, this should not be seen as limiting the scope of the disclosure to only the aforementioned system. Other wireless systems, including without limitation Wide Band Code Division Multiple Access (WCDMA), Worldwide Interoperability for Microwave Access (WiMax), Ultra Mobile Broadband (UMB) and Global System for Mobile Communications (GSM), may also benefit from exploiting the ideas covered within this disclosure.

Note further, that functions described herein as being performed by a user equipment or a network node may be distributed over a plurality of user equipments and/or network nodes. In other words, it is contemplated that the functions of the network node and user equipment described herein are not limited to performance by a single physical device and, in fact, can be distributed among several physical devices.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

Embodiments provide recovery from a radio link failure in a backhaul network.

Figure 21:
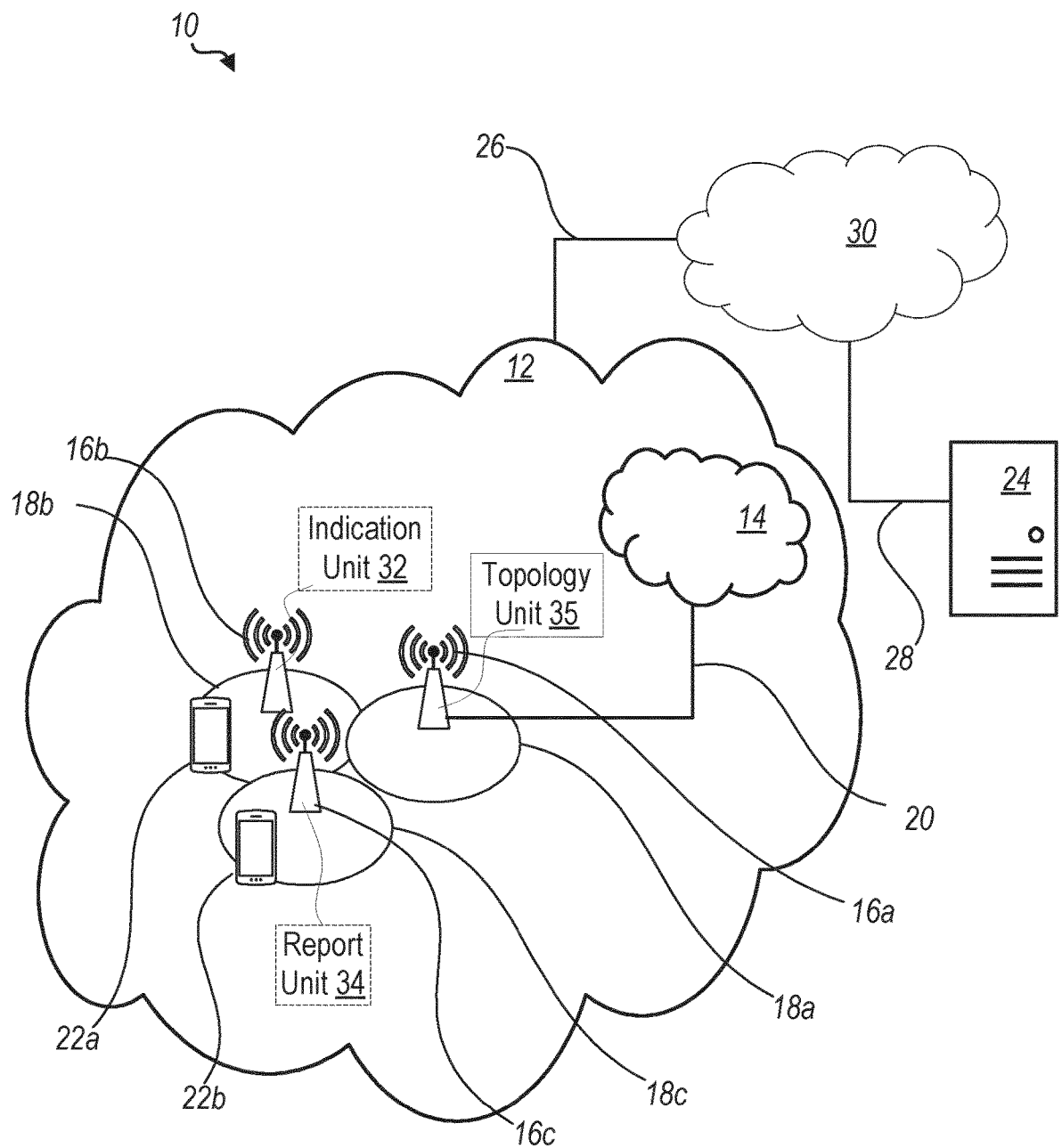
FIG. 21 is a schematic diagram of an exemplary network architecture illustrating a communication system connected via an intermediate network to a host computer according to the principles in the present disclosure.

Referring now to the drawing figures, in which like elements are referred to by like reference numerals, there is shown in FIG. 21 a schematic diagram of a communication system 10, according to an embodiment, such as a 3GPP-type cellular network that may support standards such as LTE and/or NR (5G), which comprises an access network 12, such as a radio access network, and a core network 14. The access network 12 comprises a plurality of network nodes 16a, 16b, 16c, . . . 16n (referred to collectively as network nodes 16, where only 16a-16c are illustrated in FIG. 21), such as NBs, eNBs, gNBs or other types of wireless access points, each defining a corresponding coverage area 18a, 18b . . . 18n (referred to collectively as coverage areas 18). Each network node 16a, 16b, 16c is connectable to the core network 14 over a wired or wireless connection 20. Network nodes 16 may be in communication with each other via one or more backhaul links and/or backhaul network. A first user equipment (UE) 22a located in coverage area 18b is configured to wirelessly connect to, or be paged by, the corresponding network node 16b. A second UE 22b in coverage area 18c is wirelessly connectable to the corresponding network node 16c. While a plurality of UEs 22a, 22b (collectively referred to as user equipments 22) are illustrated in this example, the disclosed embodiments are equally applicable to a situation where a sole UE is in the coverage area or where a sole UE is connecting to the corresponding network node 16. Note that although only two UEs 22 and three network nodes 16 are shown for convenience, the communication system may include many more UEs 22 and network nodes 16.

Also, it is contemplated that a UE 22 can be in simultaneous communication and/or configured to separately communicate with more than one network node 16 and more than one type of network node 16. For example, a UE 22 can have dual connectivity with a network node 16 that supports LTE and the same or a different network node 16 that supports NR. As an example, UE 22 can be in communication with an eNB for LTE/E-UTRAN and a gNB for NR/NG-RAN.

The communication system 10 may itself be connected to a host computer 24, which may be embodied in the hardware and/or software of a standalone server, a cloud-implemented server, a distributed server or as processing resources in a server farm. The host computer 24 may be under the ownership or control of a service provider, or may be operated by the service provider or on behalf of the service provider. The connections 26, 28 between the communication system 10 and the host computer 24 may extend directly from the core network 14 to the host computer 24 or may extend via an optional intermediate network 30. The intermediate network 30 may be one of, or a combination of more than one of, a public, private or hosted network. The intermediate network 30, if any, may be a backbone network or the Internet. In some embodiments, the intermediate network 30 may comprise two or more sub-networks (not shown).

The communication system of FIG. 21 as a whole enables connectivity between one of the connected UEs 22a, 22b and the host computer 24. The connectivity may be described as an over-the-top (OTT) connection. The host computer 24 and the connected UEs 22a, 22b are configured to communicate data and/or signaling via the OTT connection, using the access network 12, the core network 14, any intermediate network 30 and possible further infrastructure (not shown) as intermediaries. The OTT connection may be transparent in the sense that at least some of the participating communication devices through which the OTT connection passes are unaware of routing of uplink and downlink communications. For example, a network node 16 may not or need not be informed about the past routing of an incoming downlink communication with data originating from a host computer 24 to be forwarded (e.g., handed over) to a connected UE 22a. Similarly, the network node 16 need not be aware of the future routing of an outgoing uplink communication originating from the UE 22a towards the host computer 24.

A network node 16 is configured to include one or more of an indication unit 32 and report unit 34 which are configured to perform one or more functions described herein. In one or more embodiments, network node 16 may optionally include both indication unit 32 and report unit 34 but may implemented/activate/perform the processes of one unit instead of the other unit based on one or more characteristics of a radio link failure such as whether the radio link failure is immediately uplink (i.e., communication path toward the donor network node) of the network node 16 or whether the network node 16 is a descendant network node 16 that is affected by the radio link failure.

Example implementations, in accordance with an embodiment, of the UE 22, network node 16 and host computer 24 discussed in the preceding paragraphs will now be described with reference to FIG. 22. In a communication system 10, a host computer 24 comprises hardware (HW) 38 including a communication interface 40 configured to set up and maintain a wired or wireless connection with an interface of a different communication device of the communication system 10. The host computer 24 further comprises processing circuitry 42, which may have storage and/or processing capabilities. The processing circuitry 42 may include a processor 44 and memory 46. In particular, in addition to or instead of a processor, such as a central processing unit, and memory, the processing circuitry 42 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 44 may be configured to access (e.g., write to and/or read from) memory 46, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Processing circuitry 42 may be configured to control any of the methods and/or processes described herein and/or to cause such methods, and/or processes to be performed, e.g., by host computer 24. Processor 44 corresponds to one or more processors 44 for performing host computer 24 functions described herein. The host computer 24 includes memory 46 that is configured to store data, programmatic software code and/or other information described herein. In some embodiments, the software 48 and/or the host application 50 may include instructions that, when executed by the processor 44 and/or processing circuitry 42, causes the processor 44 and/or processing circuitry 42 to perform the processes described herein with respect to host computer 24. The instructions may be software associated with the host computer 24.

The software 48 may be executable by the processing circuitry 42. The software 48 includes a host application 50. The host application 50 may be operable to provide a service to a remote user, such as a UE 22 connecting via an OTT connection 52 terminating at the UE 22 and the host computer 24. In providing the service to the remote user, the host application 50 may provide user data which is transmitted using the OTT connection 52. The "user data" may be data and information described herein as implementing the described functionality. In one embodiment, the host computer 24 may be configured for providing control and functionality to a service provider and may be operated by the service provider or on behalf of the service provider. The processing circuitry 42 of the host computer 24 may enable the host computer 24 to observe, monitor, control, transmit to and/or receive from the network node 16 and or the user equipment 22. The processing circuitry 42 of the host computer 24 may include an information unit 54 configured to enable the service provider to one or more of determine, transmit, receive, forward and process information related to the indication, RRC signaling and/or modifying network topology by, for example, the creation of a new backhaul link.

Figure 22:
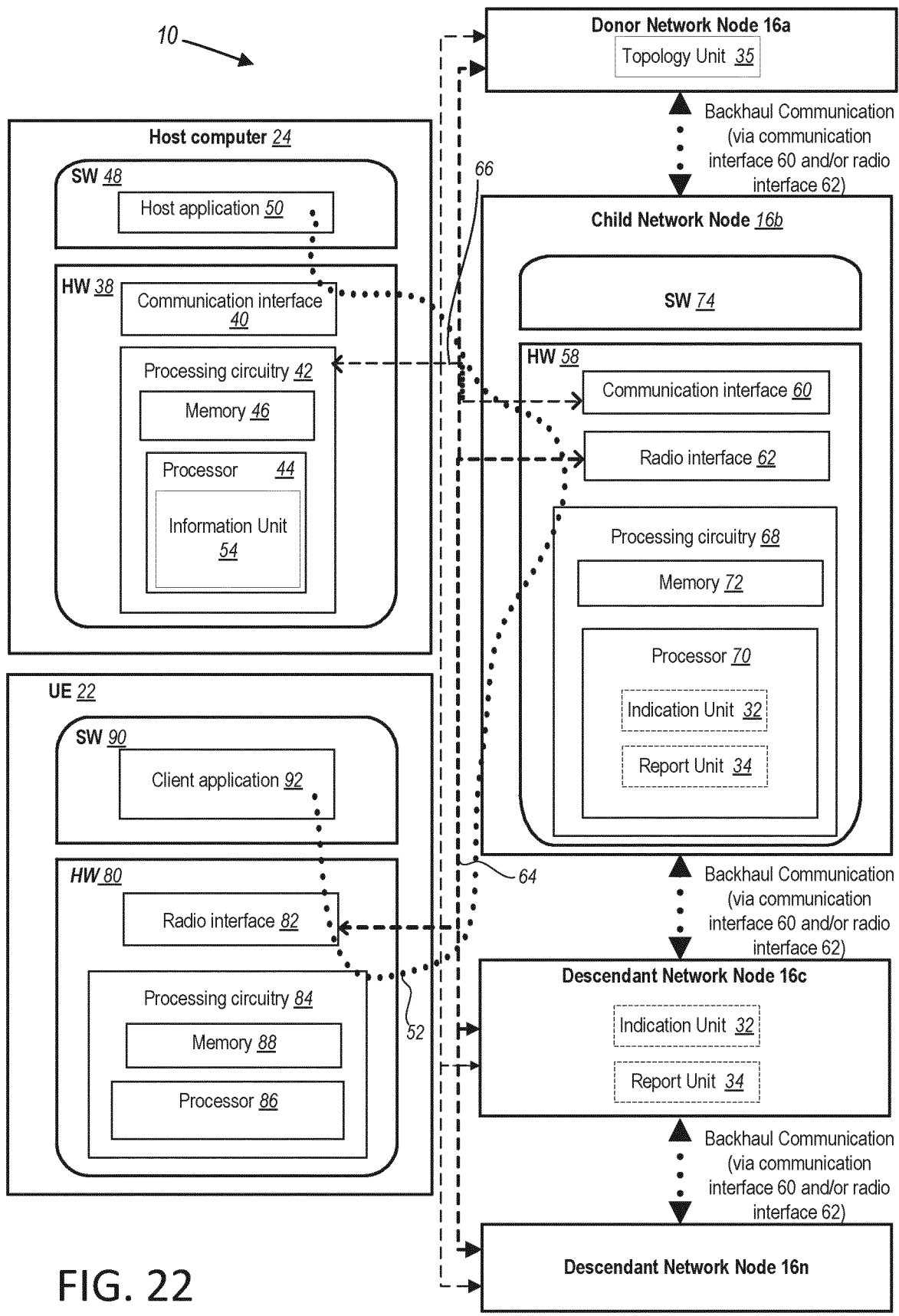
FIG. 22 is a block diagram of a host computer communicating via a network node with a user equipment over an at least partially wireless connection according to some embodiments of the present disclosure.

The communication system 10 further includes a network node 16 provided in a communication system 10 as illustrated in FIG. 22. Even though various components have been omitted from network node 16a, 16c and 16n in FIG. 22 for ease of understanding, the discussion of the components of network node 16, i.e., network node 16b in FIG. 22, is equally applicable to any of network nodes 16a and 16c-16n where the network nodes 16 may include and use different units depending on the functionality of the network node 16 such as whether the network node 16 is a donor network node, child network node, parent network node (where the parent network node is not shown in FIG. 22 for ease of understanding but may include indication unit 32 and/or report unit 34 such as, for example, if the parent network node 16 is a child or descendant network node to another network node 16), descendant network node, as described herein. As used herein, the network node directly downlink from the parent network node is referred to as a child network node or child IAB node, and the downlink network nodes from the child network node are referred to as descendant network nodes or descendent IAB nodes.

Network node 16 includes hardware 58 enabling it to communicate with the host computer 24 and with the UE 22. The hardware 58 may include a communication interface 60 for setting up and maintaining a wired or wireless connection with an interface of a different communication device of the communication system 10, as well as a radio interface 62 for setting up and maintaining at least a wireless connection 64 with a UE 22 located in a coverage area 18 served by the network node 16. The radio interface 62 may be formed as or may include, for example, one or more RF transmitters, one or more RF receivers, and/or one or more RF transceivers. The communication interface 60 may be configured to facilitate a connection 66 to the host computer 24. The connection 66 may be direct or it may pass through a core network 14 of the communication system 10 and/or through one or more intermediate networks 30 outside the communication system 10.

In the embodiment shown, the hardware 58 of the network node 16 further includes processing circuitry 68. The processing circuitry 68 may include a processor 70 and a memory 72. In particular, in addition to or instead of a processor, such as a central processing unit, and memory, the processing circuitry 68 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 70 may be configured to access (e.g., write to and/or read from) the memory 72, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the network node 16 further has software 74 stored internally in, for example, memory 72, or stored in external memory (e.g., database, storage array, network storage device, etc.) accessible by the network node 16 via an external connection. The software 74 may be executable by the processing circuitry 68. The processing circuitry 68 may be configured to control any of the methods and/or processes described herein and/or to cause such methods, and/or processes to be performed, e.g., by network node 16. Processor 70 corresponds to one or more processors 70 for performing network node 16 functions described herein. The memory 72 is configured to store data, programmatic software code and/or other information described herein. In some embodiments, the software 74 may include instructions that, when executed by the processor 70 and/or processing circuitry 68, causes the processor 70 and/or processing circuitry 68 to perform the processes described herein with respect to network node 16. For example, processing circuitry 68 of the network node 16 may include indication unit 32 configured to perform one or more radio link failure recovery functions as may be performed by a descendant network node 16c, as described herein. In another example, processing circuitry 68 of the network node 16 may include report unit 34 configured to perform one or more radio link failure recovery functions as may be performed by child network node 16b, as described herein. In another example, processing circuitry 68 of the network node 16 may include topology unit 35 configured to perform one or more radio link failure recovery functions as may be performed by donor network node 16a, as described herein.

The communication system 10 further includes the UE 22 already referred to. The UE 22 may have hardware 80 that may include a radio interface 82 configured to set up and maintain a wireless connection 64 with a network node 16 serving a coverage area 18 in which the UE 22 is currently located. The radio interface 82 may be formed as or may include, for example, one or more RF transmitters, one or more RF receivers, and/or one or more RF transceivers.

The hardware 80 of the UE 22 further includes processing circuitry 84. The processing circuitry 84 may include a processor 86 and memory 88. In particular, in addition to or instead of a processor, such as a central processing unit, and memory, the processing circuitry 84 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 86 may be configured to access (e.g., write to and/or read from) memory 88, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the UE 22 may further comprise software 90, which is stored in, for example, memory 88 at the UE 22, or stored in external memory (e.g., database, storage array, network storage device, etc.) accessible by the UE 22. The software 90 may be executable by the processing circuitry 84. The software 90 may include a client application 92. The client application 92 may be operable to provide a service to a human or non-human user via the UE 22, with the support of the host computer 24. In the host computer 24, an executing host application 50 may communicate with the executing client application 92 via the OTT connection 52 terminating at the UE 22 and the host computer 24. In providing the service to the user, the client application 92 may receive request data from the host application 50 and provide user data in response to the request data. The OTT connection 52 may transfer both the request data and the user data. The client application 92 may interact with the user to generate the user data that it provides.

The processing circuitry 84 may be configured to control any of the methods and/or processes described herein and/or to cause such methods, and/or processes to be performed, e.g., by UE 22. The processor 86 corresponds to one or more processors 86 for performing UE 22 functions described herein. The UE 22 includes memory 88 that is configured to store data, programmatic software code and/or other information described herein. In some embodiments, the software 90 and/or the client application 92 may include instructions that, when executed by the processor 86 and/or processing circuitry 84, causes the processor 86 and/or processing circuitry 84 to perform the processes described herein with respect to UE 22.

In some embodiments, the inner workings of the network node 16, UE 22, and host computer 24 may be as shown in FIG. 22 and independently, the surrounding network topology may be that of FIG. 21.

In FIG. 22, the OTT connection 52 has been drawn abstractly to illustrate the communication between the host computer 24 and the user equipment 22 via the network node 16, without explicit reference to any intermediary devices and the precise routing of messages via these devices. Network infrastructure may determine the routing, which it may be configured to hide from the UE 22 or from the service provider operating the host computer 24, or both. While the OTT connection 52 is active, the network infrastructure may further take decisions by which it dynamically changes the routing (e.g., on the basis of load balancing consideration or reconfiguration of the network).

The wireless connection 64 between the UE 22 and the network node 16 is in accordance with the teachings of the embodiments described throughout this disclosure. One or more of the various embodiments improve the performance of OTT services provided to the UE 22 using the OTT connection 52, in which the wireless connection 64 may form the last segment. More precisely, the teachings of some of these embodiments may improve the data rate, latency, and/or power consumption and thereby provide benefits such as reduced user waiting time, relaxed restriction on file size, better responsiveness, extended battery lifetime, etc. In some embodiments, a measurement procedure may be provided for the purpose of monitoring data rate, latency and other factors on which the one or more embodiments improve. There may further be an optional network functionality for reconfiguring the OTT connection 52 between the host computer 24 and UE 22, in response to variations in the measurement results. The measurement procedure and/or the network functionality for reconfiguring the OTT connection 52 may be implemented in the software 48 of the host computer 24 or in the software 90 of the UE 22, or both. In embodiments, sensors (not shown) may be deployed in or in association with communication devices through which the OTT connection 52 passes; the sensors may participate in the measurement procedure by supplying values of the monitored quantities exemplified above, or supplying values of other physical quantities from which software 48, 90 may compute or estimate the monitored quantities. The reconfiguring of the OTT connection 52 may include message format, retransmission settings, preferred routing etc.; the reconfiguring need not affect the network node 16, and it may be unknown or imperceptible to the network node 16. Some such procedures and functionalities may be known and practiced in the art. In certain embodiments, measurements may involve proprietary UE signaling facilitating the host computer's 24 measurements of throughput, propagation times, latency and the like. In some embodiments, the measurements may be implemented in that the software 48, 90 causes messages to be transmitted, in particular empty or 'dummy' messages, using the OTT connection 52 while it monitors propagation times, errors etc.

Thus, in some embodiments, the host computer 24 includes processing circuitry 42 configured to provide user data and a communication interface 40 that is configured to forward the user data to a cellular network for transmission to the UE 22. In some embodiments, the cellular network also includes the network node 16 with a radio interface 62. In some embodiments, the network node 16 is configured to, and/or the network node's 16 processing circuitry 68 is configured to perform the functions and/or methods described herein for preparing/initiating/maintaining/supporting/ending a transmission to the UE 22, and/or preparing/terminating/maintaining/supporting/ending in receipt of a transmission from the UE 22.

In some embodiments, the host computer 24 includes processing circuitry 42 and a communication interface 40 that is configured to a communication interface 40 configured to receive user data originating from a transmission from a UE 22 to a network node 16. In some embodiments, the UE 22 is configured to, and/or comprises a radio interface 82 and/or processing circuitry 84 configured to perform the functions and/or methods described herein for preparing/initiating/maintaining/supporting/ending a transmission to the network node 16, and/or preparing/terminating/maintaining/supporting/ending in receipt of a transmission from the network node 16.

Although FIGS. 21 and 22 show various "units" such as indication unit 32, and report unit 34 as being within a respective processor, it is contemplated that these units may be implemented such that a portion of the unit is stored in a corresponding memory within the processing circuitry. In other words, the units may be implemented in hardware or in a combination of hardware and software within the processing circuitry.

FIG. 23 is a flowchart illustrating an exemplary method implemented in a communication system, such as, for example, the communication system of FIGS. 21 and 22, in accordance with one embodiment. The communication system may include a host computer 24, a network node 16 and a UE 22, which may be those described with reference to FIG. 22. In a first step of the method, the host computer 24 provides user data (Block S100). In an optional substep of the first step, the host computer 24 provides the user data by executing a host application, such as, for example, the host application 50 (Block S102). In a second step, the host computer 24 initiates a transmission carrying the user data to the UE 22 (Block S104). In an optional third step, the network node 16 transmits to the UE 22 the user data which was carried in the transmission that the host computer 24 initiated, in accordance with the teachings of the embodiments described throughout this disclosure (Block S106). In an optional fourth step, the UE 22 executes a client application, such as, for example, the client application 92, associated with the host application 50 executed by the host computer 24 (Block S108).

FIG. 24 is a flowchart illustrating an exemplary method implemented in a communication system, such as, for example, the communication system of FIG. 21, in accordance with one embodiment. The communication system may include a host computer 24, a network node 16 and a UE 22, which may be those described with reference to FIGS. 21 and 22. In a first step of the method, the host computer 24 provides user data (Block S110). In an optional substep (not shown) the host computer 24 provides the user data by executing a host application, such as, for example, the host application 50. In a second step, the host computer 24 initiates a transmission carrying the user data to the UE 22 (Block S112). The transmission may pass via the network node 16, in accordance with the teachings of the embodiments described throughout this disclosure. In an optional third step, the UE 22 receives the user data carried in the transmission (Block S114).

Figure 25:
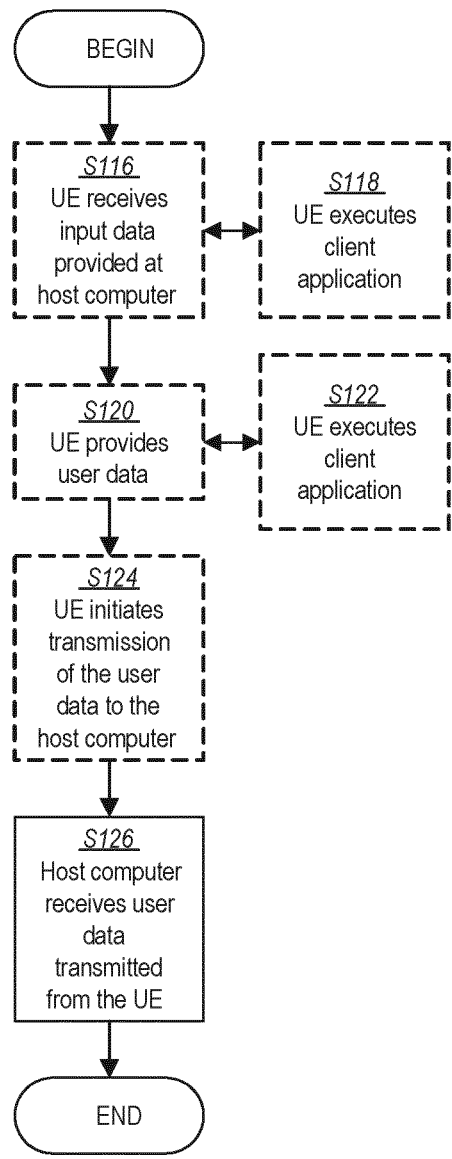
FIG. 25 is a flowchart illustrating exemplary methods implemented in a communication system including a host computer, a network node and a user equipment for receiving user data from the user equipment at a host computer according to some embodiments of the present disclosure.

FIG. 25 is a flowchart illustrating an exemplary method implemented in a communication system, such as, for example, the communication system of FIG. 21, in accordance with one embodiment. The communication system may include a host computer 24, a network node 16 and a UE 22, which may be those described with reference to FIGS. 21 and 22. In an optional first step of the method, the UE 22 receives input data provided by the host computer 24 (Block S116). In an optional substep of the first step, the UE 22 executes the client application 92, which provides the user data in reaction to the received input data provided by the host computer 24 (Block S118). Additionally or alternatively, in an optional second step, the UE 22 provides user data (Block S120). In an optional substep of the second step, the UE provides the user data by executing a client application, such as, for example, client application 92 (Block S122). In providing the user data, the executed client application 92 may further consider user input received from the user. Regardless of the specific manner in which the user data was provided, the UE 22 may initiate, in an optional third substep, transmission of the user data to the host computer 24 (Block S124). In a fourth step of the method, the host computer 24 receives the user data transmitted from the UE 22, in accordance with the teachings of the embodiments described throughout this disclosure (Block S126).

Figure 26:
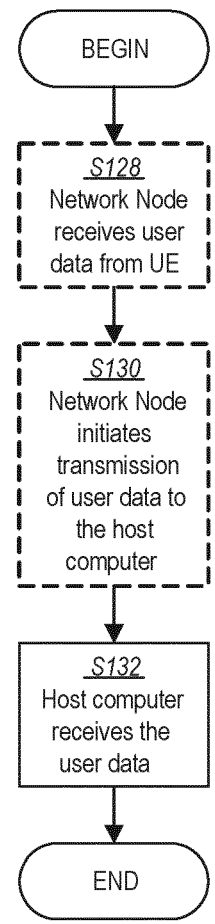
FIG. 26 is a flowchart illustrating exemplary methods implemented in a communication system including a host computer, a network node and a user equipment for receiving user data at a host computer according to some embodiments of the present disclosure.

FIG. 26 is a flowchart illustrating an exemplary method implemented in a communication system, such as, for example, the communication system of FIG. 21, in accordance with one embodiment. The communication system may include a host computer 24, a network node 16 and a UE 22, which may be those described with reference to FIGS. 21 and 22. In an optional first step of the method, in accordance with the teachings of the embodiments described throughout this disclosure, the network node 16 receives user data from the UE 22 (Block S128). In an optional second step, the network node 16 initiates transmission of the received user data to the host computer 24 (Block S130). In a third step, the host computer 24 receives the user data carried in the transmission initiated by the network node 16 (Block S132).

Figure 27:
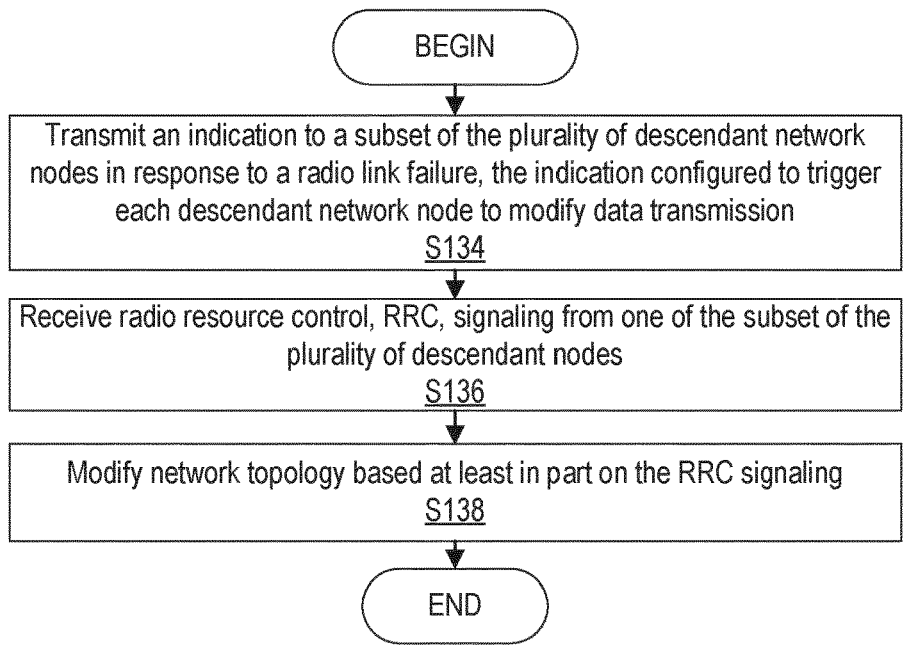
FIG. 27 is a flowchart of an exemplary process in a network node according to some embodiments of the present disclosure.

FIG. 27 is a flowchart of an exemplary process in a network node 16 such as a child network node 16*b* (i.e., child IAB node 16*b*) that is in communication with descendant network node(s) 16*c*-16*n* (i.e., descendent IAB node 16*c*-16*n*) according to some embodiments of the present disclosure. One or more Blocks and/or functions performed by network node 16 may be performed by one or more elements of network node 16 such as by indication unit 32 in processing circuitry 68, processor 70, communication interface 60, radio interface 62, etc. In one or more embodiments, network node 16 such as via one or more of processing circuitry 68, processor 70, radio interface 62 and communication interface 60 is configured to transmit (Block S134) an indication to a subset of the plurality of descendant network nodes 16*c*-16*n* in response to a radio link failure where the indication configured to trigger each descendant network node 16*c* to modify data transmission. In one or more embodiments, a descendant network node 16*c* may refer to one or more network nodes 16 that are on a downlink path from the network node 16 to the UE 22. In one or more embodiments, network node 16 such as via one or more of processing circuitry 68, processor 70, radio interface 62 and communication interface 60 is configured to receive (Block S136) radio resource control, RRC, signaling from one of the subset of the plurality of descendant network nodes 16*c*-16*n*. In one or more embodiments, network node 16 such as via one or more of processing circuitry 68, processor 70, radio interface 62 and communication interface 60 is configured to transmit (Block S138) modify network topology based at least in part on the RRC signaling.

According to one or more embodiments, the modifying of data transmission includes causing at least a reduction in one of a Packet Data Convergence Protocol, PDCP, Radio Link Control, RLC, and Medium Access Control, MAC, process. According to one or more embodiments, the indication includes a report that includes at least one of: an indication of a reason for radio link failure and measurement reports.

Figure 28:
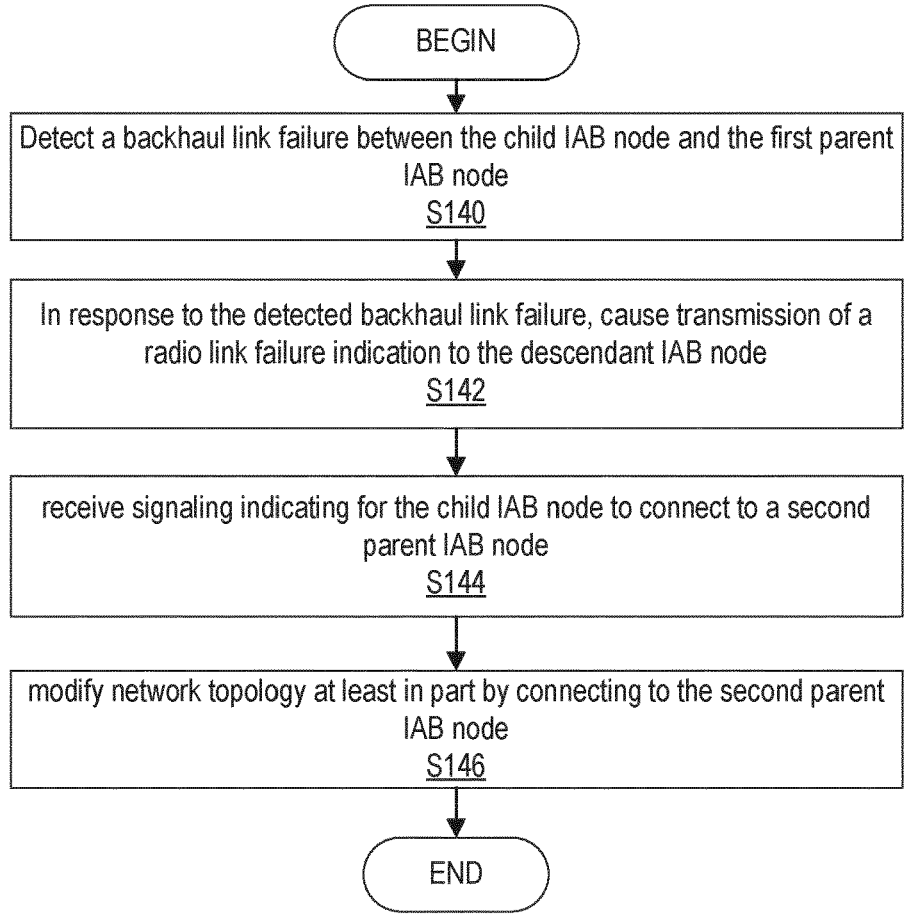
FIG. 28 is a flowchart of an exemplary process in a network node such as a child IAB node according to some embodiments of the present disclosure

FIG. 28 is a flowchart of an exemplary process in a network node 16 such as a child network node 16*b* with descendant IAB node(s) 16*c*-16*n* according to some embodiments of the present disclosure. One or more Blocks and/or functions performed by network node 16 may be performed by one or more elements of network node 16 such as by indication unit 32 in processing circuitry 68, processor 70, communication interface 60, radio interface 62, etc. In one or more embodiments, network node 16 such as via one or more of processing circuitry 68, processor 70, radio interface 62 and communication interface 60 is configured to detect (Block S140) a backhaul link failure between the child IAB node 16*b* and the first parent IAB node 16, as described herein.

In one or more embodiments, network node 16 such as via one or more of processing circuitry 68, processor 70, radio interface 62 and communication interface 60 is configured to in response to the detected backhaul link failure, cause (Block S142) transmission of a radio link failure indication to the descendant IAB node 16*c*, as described herein. In one or more embodiments, network node 16 such as via one or more of processing circuitry 68, processor 70, radio interface 62 and communication interface 60 is configured to receive (Block S144) signaling indicating for the child IAB node 16*b* to connect to a second parent IAB node, as described herein. In one or more embodiments, network node 16 such as via one or more of processing circuitry 68, processor 70, radio interface 62 and communication interface 60 is configured to modify (Block S146) network topology at least in part by connecting to the second parent IAB node 16, as described herein.

According to one or more embodiments, the radio link failure indication is configured to cause each descendant IAB node 16*c* receiving the radio link failure indication to modify data transmission and remain on an established communication path to the child IAB node 16*b* where the modifying of data transmission includes one of: at least temporarily pausing data transmission, and at least temporarily reducing a data transmission rate. According to one or more embodiments, the radio link failure indication is configured to cause each descendant IAB node 16*c* receiving the radio link failure indication to modify data transmission and remain on an established communication path to the child IAB node 16*b* where the modifying of data transmission includes limiting at least one of a packet data convergence protocol, PDCP, process, radio link control, RLC, process and medium access control, MAC, process. According to one or more embodiments, the transmission of the radio link failure indication to the descendant IAB node 16*c* includes one of broadcasting the radio link failure indication to the descendant IAB node 16*c* and transmitting the radio link failure indication to the descendant IAB node 16*c* via dedicated signaling.

According to one or more embodiments, the radio link failure indication is configured to cause each descendant IAB node 16*c* receiving the radio link failure indication to modify data transmission and remain on an established communication path to the child IAB node 16*b*. According to one or more embodiments, the radio link failure indication is a failure report that indicates at least one of: a cause of the detected backhaul link failure; IAB node identification; failure report identifier; backhaul link failure time; and results of measurements performed by the child IAB node 16*b*. According to one or more embodiments, the radio link failure indication is a failure report that includes results of measurements performed by the child IAB node 16*b* where the results of the measurements indicating at least one discoverable parent IAB node 16. According to one or more embodiments, the signaling is RRC signaling that is received from the descendant IAB node 16*c* where the RRC signaling includes an RRC reconfiguration message.

Figure 29:
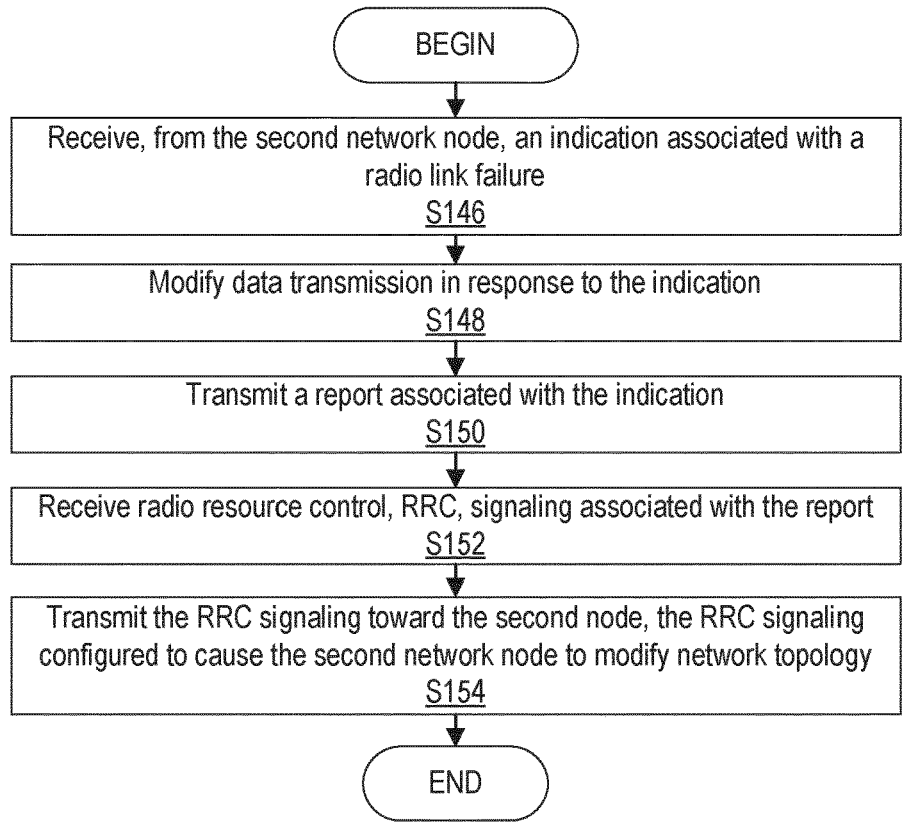
FIG. 29 is a flowchart of another exemplary process in a network node according to some embodiments of the present disclosure.

FIG. 29 is a flowchart of another exemplary process in a network node 16 such as a descendant network node 16*c* according to some embodiments of the present disclosure. One or more Blocks and/or functions performed by network node 16 may be performed by one or more elements of network node 16 such as by report unit 34 in processing circuitry 68, processor 70, communication interface 60, radio interface 62, etc. In one or more embodiments, descendant network node 16*c* such as via one or more of processing circuitry 68, processor 70, radio interface 62 and communication interface 60 is configured to receive (Block S146), from the second network node 16 (e.g., a child IAB node 16*b* with descendant IAB nodes 16*c*-16*n*), an indication associated with a radio link failure.

In one or more embodiments, the descendant network node 16*c* such as via one or more of processing circuitry 68, processor 70, radio interface 62 and communication interface 60 is configured to modify (Block S148) data transmission in response to the indication. In one or more embodiments, the descendant network node 16*c* such as via one or more of processing circuitry 68, processor 70, radio interface 62 and communication interface 60 is configured to transmit (Block S150) a report associated with the indication. In one or more embodiments, the descendant network node 16*c* such as via one or more of processing circuitry 68, processor 70, radio interface 62 and communication interface 60 is configured to receive (Block S152) radio resource control, RRC, signaling associated with the report. In one or more embodiments, the descendant network node 16*c* such as via one or more of processing circuitry 68, processor 70, radio interface 62 and communication interface 60 is configured to transmit (Block S154) the RRC signaling toward the second network node 16 (e.g., child IAB node 16*b*) where the RRC signaling configured to cause the second network node 16 to modify network topology.

According to one or more embodiments, the report is transmitted on an alternative path to a control node, i.e., donor IAB node 16*a*, that bypasses the second network node 16. According to one or more embodiments, the modifying of data transmission includes causing at least a reduction in one of a Packet Data Convergence Protocol, PDCP, Radio Link Control, RLC, and Medium Access Control, MAC, process. According to one or more embodiments, the indication includes the report that includes at least one of: an indication of a reason for radio link failure and measurement reports.

Figure 30:
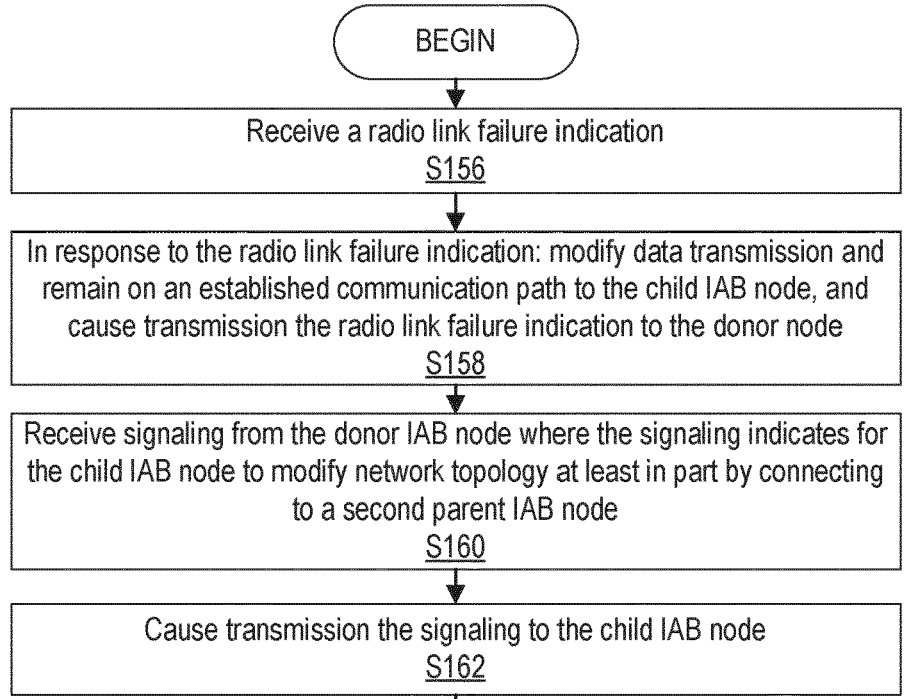
FIG. 30 is a flowchart of an exemplary process in a network node such as a descendant IAB node according to some embodiments of the present disclosure.

FIG. 30 is a flowchart of another exemplary process in a network node 16 such as a descendant network node 16*c*, i.e., descendant IAB node 16*c*, according to some embodiments of the present disclosure. One or more Blocks and/or functions performed by descendant network node 16 may be performed by one or more elements of network node 16 such as by report unit 34 in processing circuitry 68, processor 70, communication interface 60, radio interface 62, etc. In one or more embodiments, descendant network node 16 such as via one or more of processing circuitry 68, processor 70, radio interface 62 and communication interface 60 is configured to receive (Block S156) a radio link failure indication, as described herein. In one or more embodiments, descendant network node 16*c* such as via one or more of processing circuitry 68, processor 70, radio interface 62 and communication interface 60 is configured to in response to the radio link failure indication (Block S158), modify data transmission and remain on an established communication path to the child IAB node 16*b*, and transmit the radio link failure indication to the donor node 16*a*.

In one or more embodiments, descendant network node 16*c* such as via one or more of processing circuitry 68, processor 70, radio interface 62 and communication interface 60 is configured to receive (Block S160) signaling from the donor IAB node 16*a* where the signaling indicates for the child IAB node 16*b* to modify network topology at least in part by connecting to a second parent IAB node 16, as described herein. In one or more embodiments, descendant network node 16*c* such as via one or more of processing circuitry 68, processor 70, radio interface 62 and communication interface 60 is configured to cause (Block S162) transmission of the signaling to the child IAB node 16*b*, as described herein.

According to one or more embodiments, the processing circuitry 68 is further configured to: determine whether an alternate communication path from the descendant IAB node 16*c* to the donor IAB node 16*a* is configured; and if the alternate communication path is configured, cause transmission of the radio link failure indication along the alternative communication path to the donor IAB node 16*a*. According to one or more embodiments, the processing circuitry 68 is further configured to: determine whether an alternate communication path from the descendant IAB node 16*c* to the donor IAB node 16*a* is configured; and if the alternate communication path is not configured, cause transmission of the radio link failure indication to another descendant IAB node 16*c*. According to one or more embodiments, the modifying of data transmission includes one of: at least temporarily pausing data transmission; and at least temporarily reducing a data transmission rate.

According to one or more embodiments, the modifying of data transmission includes limiting at least one of a packet data convergence protocol, PDCP, process, radio link control, RLC, process and medium access control, MAC, process.

According to one or more embodiments, the radio link failure indication is a failure report destined for a donor IAB node 16*a* where the failure report indicates at least one of: a cause of the radio link failure; IAB node identification; failure report identifier; backhaul link failure time; and results of measurements performed by the child IAB node 16*b*. According to one or more embodiments, the radio link failure indication is a failure report destined for a donor IAB node 16*a* where the failure report includes results of measurements performed by the child IAB node 16*b* and where the results of the measurements indicating at least one discoverable parent IAB node 16. According to one or more embodiments, the signaling is RRC signaling that includes an RRC reconfiguration message. According to one or more embodiments, the descendant IAB node 16*c* is one of: a logically next hop from the first parent IAB node 16; and at least two logical next hops from the first parent IAB node 16.

Figure 31:
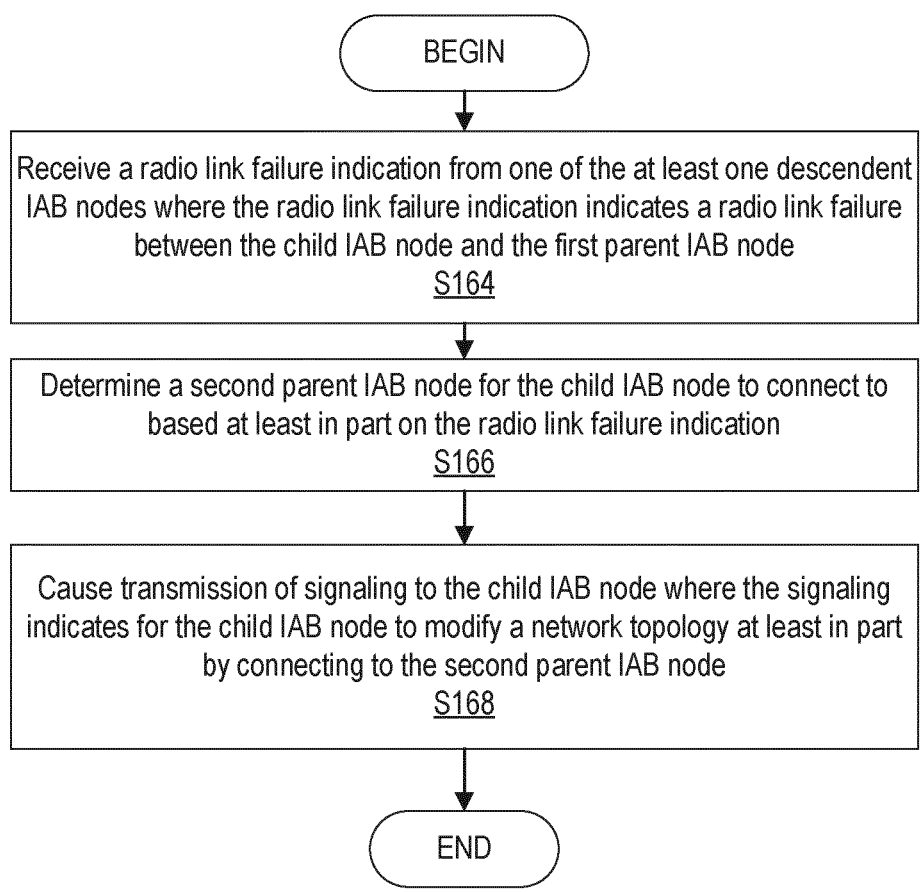
FIG. 31 is a flowchart of an exemplary process in a network node such as a donor IAB node according to some embodiments of the present disclosure.

FIG. 31 is a flowchart of another exemplary process in a network node 16 such as a donor network node 16*a*, i.e., donor IAB node 16*a*, according to some embodiments of the present disclosure. One or more Blocks and/or functions performed by donor network node 16*a* may be performed by one or more elements of network node 16 such as by topology unit 35 in processing circuitry 68, processor 70, communication interface 60, radio interface 62, etc. In one or more embodiments, donor network node 16*a* such as via one or more of processing circuitry 68, processor 70, radio interface 62 and communication interface 60 is configured to receive (block S164) a radio link failure indication from one of the at least one descendent IAB nodes 16*c* where the radio link failure indication indicates a radio link failure between the child IAB node 16*b* and the first parent IAB node 16, as described herein.

In one or more embodiments, donor network node 16*a* such as via one or more of processing circuitry 68, processor 70, radio interface 62 and communication interface 60 is configured to determine (Block S166) a second parent IAB node 16 for the child IAB node 16*b* to connect to based at least in part on the radio link failure indication, as described herein. In one or more embodiments, donor network node 16*a* such as via one or more of processing circuitry 68, processor 70, radio interface 62 and communication interface 60 is configured to cause (Block S168) transmission of signaling to the child IAB node 16*b* where the signaling indicates for the child IAB node 16*b* to modify a network topology at least in part by connecting to the second parent IAB node 16, as described herein.

According to one or more embodiments, the radio link failure indication is configured to cause each descendant IAB node 16*c* receiving the radio link failure indication to modify data transmission and remain on an established communication path to the child IAB node 16*b* where the modifying of data transmission includes one of: at least temporarily pausing data transmission, and at least temporarily reducing a data transmission rate. According to one or more embodiments, the radio link failure indication is configured to cause each descendant IAB node 16*c* receiving the radio link failure indication to modify data transmission and remain on an established communication path to the child IAB node 16*b* where the modifying of data transmission includes limiting at least one of a packet data convergence protocol, PDCP, process, radio link control, RLC, process and medium access control, MAC, process. According to one or more embodiments, the radio link failure indication is configured to cause each descendant IAB node 16*c* receiving the radio link failure indication to modify data transmission and remain on an established communication path to the descendant IAB node 16*c*.

According to one or more embodiments, the indication is a failure report destined for a donor IAB node 16*a*, the failure report indicates at least one of: a cause of the radio link failure; IAB node identification; failure report identifier; backhaul link failure time; and results of measurements performed by the child IAB node 16*b*. According to one or more embodiments, the radio link failure indication is a failure report including results of measurements performed by the child IAB node 16b where the results of the measurements indicates at least one discoverable parent IAB node 16. According to one or more embodiments, the signaling is RRC signaling that includes an RRC reconfiguration message. According to one or more embodiments, the at least one descendant IAB node 16c is a plurality of descendant IAB nodes 16c-16n.

Embodiments provide for recovery from a radio link failure in a backhaul network. In particular, having generally described arrangements for recovery from a radio link failure in a backhaul network, details for these arrangements, functions and processes are provided as follows, and which may be implemented by the network node/IAB node 16 and/or host computer 24.

When an IAB node 16 (referred to as "child IAB node 16b" in one or more embodiments) detects a type of link failure towards its parent IAB node 16, e.g., radio link failure, on its backhaul link, the IAB node 16 may send a first indication (referred to as primary indication(s) in one or more embodiments and/or examples) to other descendant IAB nodes 16c-16n/UEs 22 informing about such a failure. This can be done in a dedicated manner (i.e., one by one to each child/descendant IAB node 16c via a MAC CE, PDCP control PDU, etc.) or broadcast (e.g., in a SIB, system information block).

These primary indications may result in that the transmissions of the descendant IAB nodes 16 and/or UEs 22 that receive such an indication may need to be modified. For example, the transmissions may be at last temporarily halted, or the transmission rate of Downlink (DL)/Uplink (UL) data may be at least temporarily reduced. In other words, receiving such an indication may result in some of the PDCP, RLC, and MAC processes are halted or limited or reduced. In one or more embodiments, the transmissions of descendant IAB nodes 16 and/or UEs 22 in the established communication path toward child IAB node 16b are modified while the transmissions of other descendant IAB nodes 16 and/or UEs 22 on a different communication that still has connectivity to donor IAB node 16a may not modify their transmissions based on the primary indications. Further, in one or more embodiments, one or more of the other descendant IAB nodes 16 may still receive the primary indications for forwarding and/or transmission of the primary indications to the donor IAB node 16a.

The primary indication can include a failure report that is to be forwarded to the donor CU of an IAB node 16, i.e., IAB donor node 16a. One possible purpose of the primary indication is for the descendant IAB nodes 16c-16n to pause/reduce transmission toward the child IAB node 16b and possibly to find alternate parents IAB node 16 for transmitting, for example, a failure report. While the final destination of the failure reports is the donor CU, the message may help the CU choose/select the new parent IAB node 16 to the child IAB node 16b. As used herein, a descendant IAB node 16c may correspond to a child IAB node 16b that is more than two logical hops from the parent IAB node 16. The failure report can also be sent instead in a separate message after the primary indication (e.g., a secondary indication). The child IAB node 16b can decide to send the failure report only to its descendant IAB nodes 16c-16n which already have alternate paths if the child IAB node 16b has such information available.

The failure report can contain information such as one or more of the following:
the cause for the link failure,
IAB node 16 identification,
failure report ID,
failure time,
latest measurement results from the child IAB node 16b, among other data.

The measurement report can include the latest measurement that the child IAB node 16b has before failure, and/or can include a measurement performed after failure (e.g., based on a measurement configuration that was received from the CU that becomes active only when backhaul failure is detected). The measurement results may contain a list of cells that the child IAB node 16b has discovered as possible parent IAB nodes 16 (which may have been defined by some threshold signal quality value specified by measurement configuration) and may be ordered in the list according to the quality (e.g., in descending order of signal strength). Note that the cells of a descendant IAB node 16c of the child IAB node 16b could be part of the measurement result.

If a descendant IAB node 16c has an alternate path to the donor IAB node 16a, the descendant IAB node 16c forwards that information (e.g., measurement report) towards the CU via that path. This can be via a new message (e.g., new F1 message, new RRC message) or it can be included in an enhanced version of existing messages (e.g., F1 UL RRC transfer message, RRC Measurement report, etc.). The identification of the child IAB node 16b can be a piece of information that is added when constructing the F1 or RRC message used to send the failure report, rather than including such information within the failure report itself. The identity of the descendant IAB node 16c can also be included in the F1 or RRC message in order to cause the CU to later send a response to that message. The descendant IAB node 16c can send a message to the child IAB node 16b indicating that it has sent the failure report as instructed. The child IAB node 16b, upon receiving this indication, can send another message to other descendant IAB nodes 16c-16n that the failure report has been sent, thereby informing the other descendant IAB nodes 16c-16n to stop the forwarding of the failure report on its behalf, if they have not done so already.

If a descendant IAB node 16c has no alternate path to the donor network node 16a, i.e., IAB donor node 16a, then the descendant IAB node 16c can pass the report to its descendant IAB node 16c and the process is repeated hierarchically.

When the CU receives the failure report, it may identify the affected child IAB node 16b by looking into IAB node 16 identification, and the additional information contained within the failure report (i.e., measurement result) in order to determine the best alternate parent for the child IAB node 16b.

The CU then prepares an RRC Reconfiguration message to the child IAB node 16b, which contains the configuration that the child IAB node 16b may use to connect to the new target parent IAB node 16. Since the CU knows the descendant IAB node 16c that forwarded the message (either implicitly or by looking into the descendant IAB node 16c identification info in the header of the F1/RRC message that delivered the failure report), the CU may be able to deduce the path on which to send the message. This may occur by putting the indicated descendant IAB node 16c address in the outgoing container message (if the descendant IAB node 16c has different L2 addresses for each alternate path to the donor, for example). The RRC reconfiguration message is then sent to the child IAB node 16b via the descendant IAB node 16c (for example, the reconfiguration message is embedded in an outer message destined to the descendant IAB node 16c).

The descendant IAB node 16c, upon getting this RRC reconfiguration message, extracts the RRC reconfiguration message destined for the child IAB node 16 and forwards it to the child IAB node 16. The child IAB node 16b applies the RRC reconfiguration and connects to the target parent IAB node 16 indicated in the reconfiguration message. The child IAB node 16b can send another indication to its descendant IAB nodes 16c-16n indicating that the backhaul connection has been restored, thereby triggering the descendant IAB nodes 16c-16n to resume normal operation (e.g., resuming sending UL data). In other words, the descendant IAB nodes 16c-16n may remain on the established communication path to the child IAB node 16b while the process for modifying the network topology is performed, thereby at least temporarily preventing each descendant IAB node 16c from initiating backup link discovery procedures to connect to an alternate communication path to donor IAB node 16a.

EXAMPLES

It is noted that the "network node 16" referred to below may be IAB node 16 such as a descendant IAB node 16, child IAB node 16, etc.

Example A1. A network node 16 configured to communicate with a plurality of descendant network nodes 16c-16n over a backhaul network, the network node 16 configured to, and/or comprising a radio interface 62 and/or comprising processing circuitry 68 configured to:
  transmit an indication to a subset of the plurality of descendant network nodes 16c-16n in response to a radio link failure, the indication configured to trigger each descendant network node 16c to modify data transmission;
  receive radio resource control, RRC, signaling from one of the subset of the plurality of descendant network nodes 16c-16n; and
  modify network topology based at least in part on the RRC signaling.

Example A2. The network node 16 of Example A1, wherein modifying data transmission includes causing at least a reduction in one of a Packet Data Convergence Protocol, PDCP, Radio Link Control, RLC, and Medium Access Control, MAC, process.

Example A3. The network node 16 of Example A1, wherein the indication includes a report that includes at least one of:
  an indication of a reason for radio link failure; and
  measurement reports.

Example B1. A method implemented in a network node 16 configured to communicate with a plurality of descendant network nodes 16c-16n over a backhaul network, the method comprising:
  transmitting an indication to a subset of the plurality of descendant network nodes 16c-16n in response to a radio link failure, the indication configured to trigger each descendant network node 16c to modify data transmission;
  receiving radio resource control, RRC, signaling from one of the subset of the plurality of descendant network nodes 16c-16n; and
  modifying network topology based at least in part on the RRC signaling.

Example B2. The method of Example B1, wherein modifying data transmission includes causing at least a reduction in one of a Packet Data Convergence Protocol, PDCP, Radio Link Control, RLC, and Medium Access Control, MAC, process.

Example B3. The method of Example B1, wherein the indication includes a report that includes at least one of:
  an indication of a reason for radio link failure; and
  measurement reports.

Example C1. A first network node 16 configured to communicate with a second network node 16 over a backhaul network, the first network node 16 configured to, and/or comprising a radio interface 62 and/or processing circuitry 68 configured to:
  receive, from the second network node 16, an indication associated with a radio link failure;
  modify data transmission in response to the indication;
  transmit a report associated with the indication;
  receive radio resource control, RRC, signaling associated with the report; and
  transmit the RRC signaling toward the second network node, the RRC signaling configured to cause the second node to modify network topology.

Example C2. The first network node 16 of Example C1, wherein the report is transmitted on an alternative path to a control network node that bypasses the second network node 16.

Example C3. The first network node 16 of Example C1, wherein modifying data transmission includes causing at least a reduction in one of a Packet Data Convergence Protocol, PDCP, Radio Link Control, RLC, and Medium Access Control, MAC, process.

Example C4. The first network node 16 of Example C1, wherein the indication includes the report that includes at least one of:
  an indication of a reason for radio link failure; and
  measurement reports.

Example D1. A method implemented in a first network node 16 that is configured to communicate with a second network node 16 over a backhaul network, the method comprising:
  receiving, from the second network node 16, an indication associated with a radio link failure;
  modifying data transmission in response to the indication;
  transmitting a report associated with the indication;
  receiving radio resource control, RRC, signaling associated with the report; and
  transmitting the RRC signaling toward the second network node 16, the RRC signaling configured to cause the second network node 16 to modify network topology.

Example D2. The method of Example D1, wherein the report is transmitted on an alternative path to a control network node 16 that bypasses the second network node 16.

Example D3. The method of Example D1, wherein modifying data transmission includes causing at least a reduction in one of a Packet Data Convergence Protocol, PDCP, Radio Link Control, RLC, and Medium Access Control, MAC, process Example D4. The method of Example D1, wherein the indication includes the report that includes at least one of:
  an indication of a reason for radio link failure; and
  measurement reports.

As will be appreciated by one of skill in the art, the concepts described herein may be embodied as a method, data processing system, computer program product and/or computer storage media storing an executable computer program. Accordingly, the concepts described herein may take the form of an entirely hardware embodiment, an entirely software embodiment or an embodiment combining software and hardware aspects all generally referred to herein as a "circuit" or "module." Any process, step, action and/or functionality described herein may be performed by, and/or associated to, a corresponding module, which may be implemented in software and/or firmware and/or hardware. Furthermore, the disclosure may take the form of a computer program product on a tangible computer usable storage medium having computer program code embodied in the medium that can be executed by a computer. Any suitable tangible computer readable medium may be utilized including hard disks, CD-ROMs, electronic storage devices, optical storage devices, or magnetic storage devices.

Some embodiments are described herein with reference to flowchart illustrations and/or block diagrams of methods, systems and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer (to thereby create a special purpose computer), special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory or storage medium that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations of the concepts described herein may be written in an object oriented programming language such as Java® or C++. However, the computer program code for carrying out operations of the disclosure may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

Abbreviations that may be used in the preceding description include

ABBREVIATION EXPLANATION

3GPP 3rd Generation Partnership Project
ACK Acknowledgement
BSR Buffer Status Report
CN Core Network
CU Central Unit
CP Control Plane
DL Downlink
DU Distributed Unit
IAB Integrated Access Backhaul
MAC Medium Access Control
NACK Negative ACK
PDCP Packet Data Convergence Protocol
PDU Protocol Data Unit
RLC Radio Link Control
RRC Radio Resource Control
SIB System Information Block
SDU Service Data Unit
SR Scheduling Request
UP User Plane
UE User Equipment
UL Uplink It will be appreciated by persons skilled in the art that the embodiments described herein are not limited to what has been particularly shown and described herein above. In addition, unless mention was made above to the contrary, it should be noted that all of the accompanying drawings are not to scale. A variety of modifications and variations are possible in light of the above teachings without departing from the scope of the following claims.

What is claimed is:

1. A child integrated access backhaul (IAB) node configured to communicate with a first parent IAB node and a descendant IAB node over a backhaul network, the child IAB node comprising:
    processing circuitry configured to:
        detect a backhaul link failure between the child IAB node and the first parent IAB node;
        in response to the detected backhaul link failure, cause transmission of a radio link failure indication to the descendant IAB node, the radio link failure indication being configured to cause each descendant IAB node in an established communication path receiving the radio link failure indication to modify data transmission and remain on the established communication path to the child IAB node;
        receive signaling indicating for the child IAB node to connect to a second parent IAB node; and
        modify network topology at least in part by connecting to the second parent IAB node.

2. The child IAB node of claim 1, wherein the radio link failure indication is a failure report that indicates at least one of:
    a cause of the detected backhaul link failure;

IAB node identification;
failure report identifier;
backhaul link failure time; and
results of measurements performed by the child IAB node.

3. The child IAB node of claim 1, wherein the radio link failure indication is a failure report that includes results of measurements performed by the child IAB node, the results of the measurements indicating at least one discoverable parent IAB node.

4. A method implemented by a child integrated access backhaul (IAB) node that is configured to communicate with a first parent IAB node and a descendant IAB node over a backhaul network, the method comprising:
    detecting a backhaul link failure between the child IAB node and the first parent IAB node;
    in response to the detected backhaul link failure, causing transmission of a radio link failure indication to the descendant IAB node, the radio link failure indication being configured to cause each descendant IAB node in an established communication path receiving the radio link failure indication to modify data transmission and remain on the established communication path to the child IAB node;
    receiving signaling indicating for the child IAB node to connect to a second parent IAB node; and
    modifying network topology at least in part by connecting to the second parent IAB node.

5. The method of claim 4, wherein the radio link failure indication is a failure report that indicates at least one of:
    a cause of the detected backhaul link failure;
    IAB node identification;
    failure report identifier;
    backhaul link failure time; and
    results of measurements performed by the child IAB node.

6. The method of claim 4, wherein the radio link failure indication is a failure report that includes results of measurements performed by the child IAB node, the results of the measurements indicating at least one discoverable parent IAB node.

7. A donor integrated access backhaul (IAB) node in communication with a first parent IAB node, a child IAB node and at least one descendant IAB node over a backhaul network, the first parent IAB node being in communication with the child IAB node and the descendant IAB node, the donor IAB node comprising:
    processing circuitry configured to:
        receive a radio link failure indication from one of the at least one descendent IAB nodes, the radio link failure indication indicating a radio link failure between the child IAB node and the first parent IAB node, the radio link failure indication being configured to cause each descendant IAB node in an established communication path receiving the radio link failure indication to modify data transmission and remain on the established communication path to the child IAB node;
        determine a second parent IAB node for the child IAB node to connect to based at least in part on the radio link failure indication; and
        cause transmission of signaling to the child IAB node, the signaling indicating for the child IAB node to modify a network topology at least in part by connecting to the second parent IAB node.

8. The donor IAB node of claim 7, wherein the indication is a failure report destined for a donor IAB node, the failure report indicates at least one of:
    a cause of the radio link failure;
    IAB node identification;
    failure report identifier;
    backhaul link failure time; and
    results of measurements performed by the child IAB node.

9. The donor IAB node of claim 7, wherein the radio link failure indication is a failure report including results of measurements performed by the child IAB node, the results of the measurements indicating at least one discoverable parent IAB node.

10. A method implemented by a donor integrated access backhaul (IAB) node that is in communication with a first parent IAB node, a child IAB node and at least one descendant IAB node over a backhaul network, the first parent IAB node being in communication with the child IAB node and the descendant IAB node, the method comprising:
    receiving a radio link failure indication from one of the at least one descendent IAB node, the radio link failure indication indicating a radio link failure between the child IAB node and the first parent IAB node, the radio link failure indication being configured to cause each descendant IAB node in an established communication path receiving the radio link failure indication to modify data transmission and remain on the established communication path to the child IAB node;
    determining a second parent IAB node for the child IAB node to connect to based at least in part on the radio link failure indication; and
    causing transmission of signaling to the child IAB node, the signaling indicating for the child IAB node to modify a network topology at least in part by connecting to the second parent IAB node.

11. The method of claim 10, wherein the radio link failure indication is a failure report destined for a donor IAB node, the failure report indicates at least one of:
    a cause of the radio link failure;
    IAB node identification;
    failure report identifier;
    backhaul link failure time; and
    results of measurements performed by the child IAB node.

12. The method of claim 10, wherein the radio link failure indication is a failure report including results of measurements performed by the child IAB node, the results of the measurements indicating at least one discoverable parent IAB node.

13. A descendant integrated access backhaul (IAB) node in communication with a donor IAB node via at least a first parent IAB node and a child IAB node over a backhaul network, the descendant IAB node comprising:
    processing circuitry configured to:
        receive a radio link failure indication;
        in response to the radio link failure indication:
            modify data transmission and remain on an established communication path to the child IAB node; and
            cause transmission of the radio link failure indication to the donor node;
        receive signaling from the donor IAB node, the signaling indicating for the child IAB node to modify network topology at least in part by connecting to a second parent IAB node; and
        cause transmission the signaling to the child IAB node.

14. The descendant IAB node of claim 13, wherein the processing circuitry is further configured to:
   determine whether an alternate communication path from the descendant IAB node to the donor IAB node is configured; and
   if the alternate communication path is configured, cause transmission of the radio link failure indication along the alternative communication path to the donor IAB node.

15. The descendant IAB node of claim 13, wherein the radio link failure indication is a failure report destined for a donor IAB node, the failure report including results of measurements performed by the child IAB node, the results of the measurements indicating at least one discoverable parent IAB node.

16. A method implemented by a descendant integrated access backhaul (IAB) node that is in communication with a donor IAB node via at least a first parent IAB node and a child IAB node over a backhaul network, the method comprising:
   receiving a radio link failure indication;
   in response to the radio link failure indication:
      modifying data transmission and remain on an established communication path to the child IAB node; and
      causing transmission of the radio link failure indication to the donor IAB node;
   receiving signaling from the donor IAB node, the signaling indicating for the child IAB node to modify network topology at least in part by connecting to a second parent IAB node; and
   causing transmission of the signaling to the child IAB node.

17. The method of claim 16, further comprising:
   determining whether an alternate communication path from the descendant IAB node to the donor IAB node is configured; and
   if the alternate communication path is configured, causing transmission of the radio link failure indication along the alternative communication path to the donor IAB node.

18. The method of claim 16, further comprising:
   determining whether an alternate communication path from the descendant IAB node to the donor IAB node is configured; and
   if the alternate communication path is not configured, causing transmission of the radio link failure indication to another descendant IAB node.

19. The method of claim 16, wherein the radio link failure indication is a failure report destined for a donor IAB node, the failure report indicates at least one of:
   a cause of the radio link failure;
   IAB node identification;
   failure report identifier;
   backhaul link failure time; and
   results of measurements performed by the child IAB node.

20. The method of claim 16, wherein the radio link failure indication is a failure report destined for a donor IAB node, the failure report including results of measurements performed by the child IAB node, the results of the measurements indicating at least one discoverable parent IAB node.

* * * * *